(12) United States Patent
Nonaka et al.

(10) Patent No.: US 7,519,685 B2
(45) Date of Patent: Apr. 14, 2009

(54) CONTENTS LINKAGE INFORMATION DELIVERY SYSTEM

(75) Inventors: Masao Nonaka, Kadoma (JP); Masato Yamamichi, Kadoma (JP); Motoji Ohmori, Hirakata (JP); Masaya Yamamoto, Hirakata (JP); Wataru Ikeda, Osaka (JP); Masataka Minami, Arcadia, CA (US); Kazuhisa Watanabe, Yokohama (JP); Atsushi Saso, Kawasaki (JP)

(73) Assignee: Panasonic Corporation, Osaka (JP)

( * ) Notice: Subject to any disclaimer, the term of this patent is extended or adjusted under 35 U.S.C. 154(b) by 1038 days.

(21) Appl. No.: 10/406,217

(22) Filed: Apr. 4, 2003

(65) Prior Publication Data

US 2005/0262217 A1 Nov. 24, 2005

(51) Int. Cl.
*G06F 15/16* (2006.01)
(52) U.S. Cl. ...................................... 709/219
(58) Field of Classification Search ................... 709/219
See application file for complete search history.

(56) References Cited

U.S. PATENT DOCUMENTS

| | | | | |
|---|---|---|---|---|
| 5,682,482 | A | * | 10/1997 | Burt et al. ...................... 705/42 |
| 5,696,905 | A | | 12/1997 | Reimer et al. |
| 5,991,798 | A | | 11/1999 | Ozaki et al. |
| 6,160,954 | A | * | 12/2000 | Ogawa ......................... 386/111 |
| 2002/0104101 | A1 | * | 8/2002 | Yamato et al. ............... 709/219 |
| 2005/0210145 | A1 | * | 9/2005 | Kim et al. .................... 709/219 |
| 2006/0161635 | A1 | * | 7/2006 | Lamkin et al. ............... 709/217 |
| 2007/0033292 | A1 | * | 2/2007 | Sull et al. .................... 709/203 |

FOREIGN PATENT DOCUMENTS

| | | |
|---|---|---|
| EP | 1 398 970 | 3/2004 |
| JP | 7-321748 | 12/1995 |
| JP | 8-287107 | 11/1996 |
| JP | 9-307859 | 11/1997 |
| JP | 10-63734 | 3/1998 |
| JP | 10-105452 | 4/1998 |
| JP | 2002-109259 | 4/2002 |
| JP | 2002-374480 | 12/2002 |
| WO | 02/03699 | 1/2002 |

* cited by examiner

*Primary Examiner*—Jeffrey Pwu
*Assistant Examiner*—Benjamin R Bruckart
(74) *Attorney, Agent, or Firm*—Wenderoth, Lind & Ponack, L.L.P.

(57) ABSTRACT

A contents linkage information delivery system for delivering a related content that is associated with another content. The system includes a first playback apparatus, a server for transmitting the related content, and a second playback apparatus for playing back the related content, which each communicate via a communications channel. The first playback apparatus includes a playback position information acquisition unit for acquiring time-base playback position information of the other content, a request input unit for receiving a user request, and a first transmission unit for transmitting the time-base playback position information. The server includes a first reception unit for receiving the time-base playback position information a related content acquisition unit for acquiring the related content based on the time-base playback position information, and a second transmission unit for transmitting the related content. The second playback apparatus includes a second reception unit.

4 Claims, 27 Drawing Sheets

FIG.2

CONTENT DATA CNTDATA
- CONTENT IDENTIFIER CID
- FIRST CONTENT CNT1

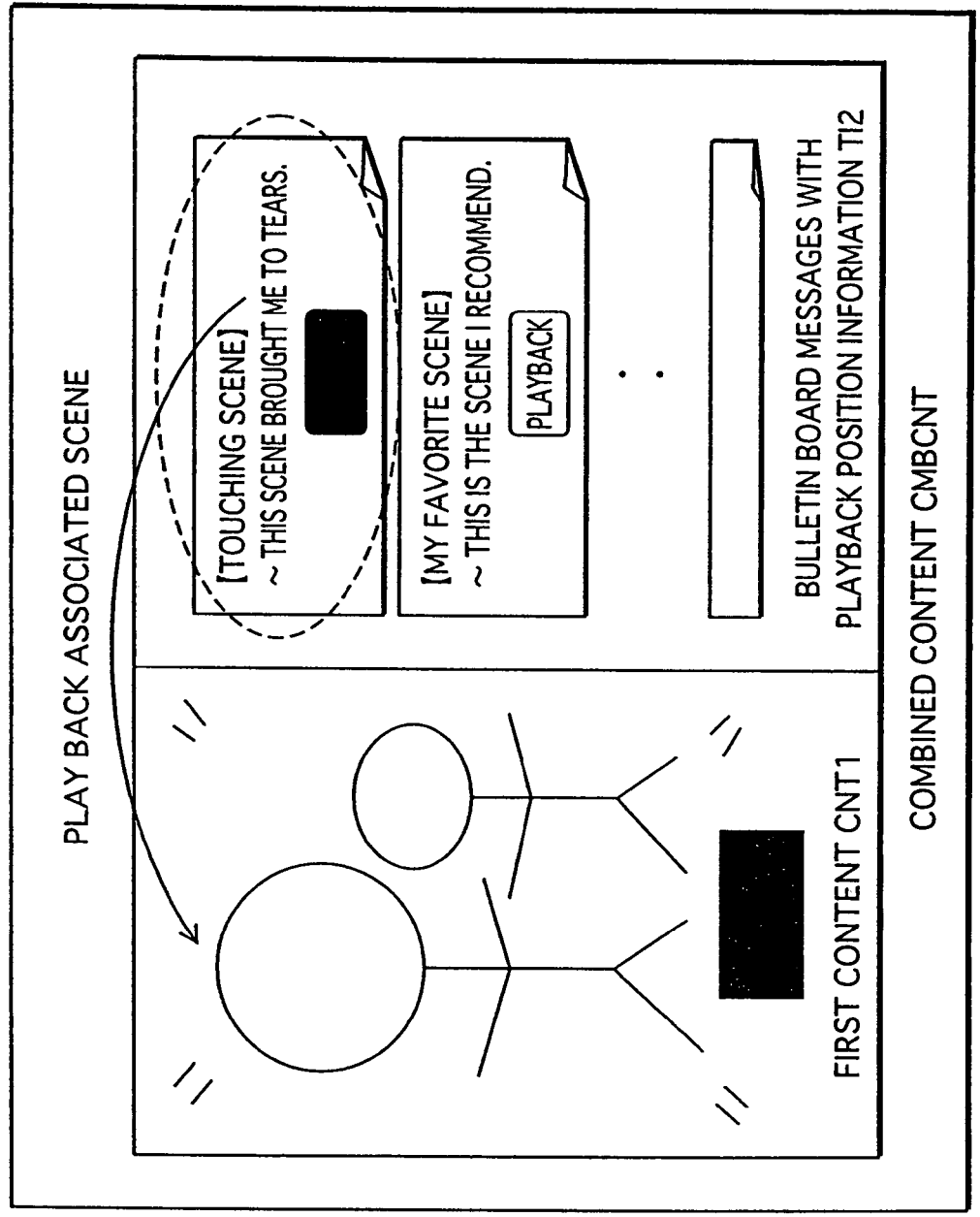

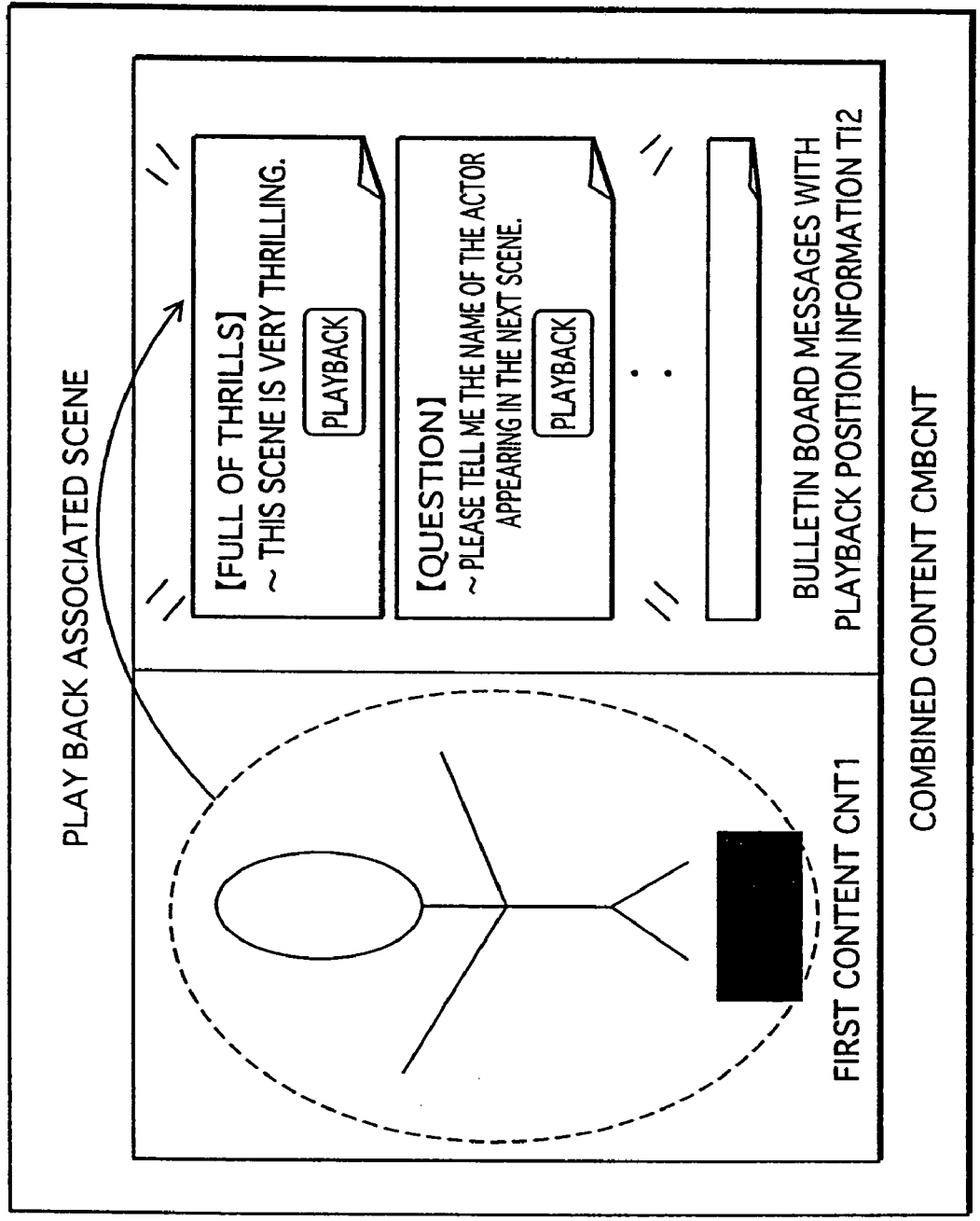

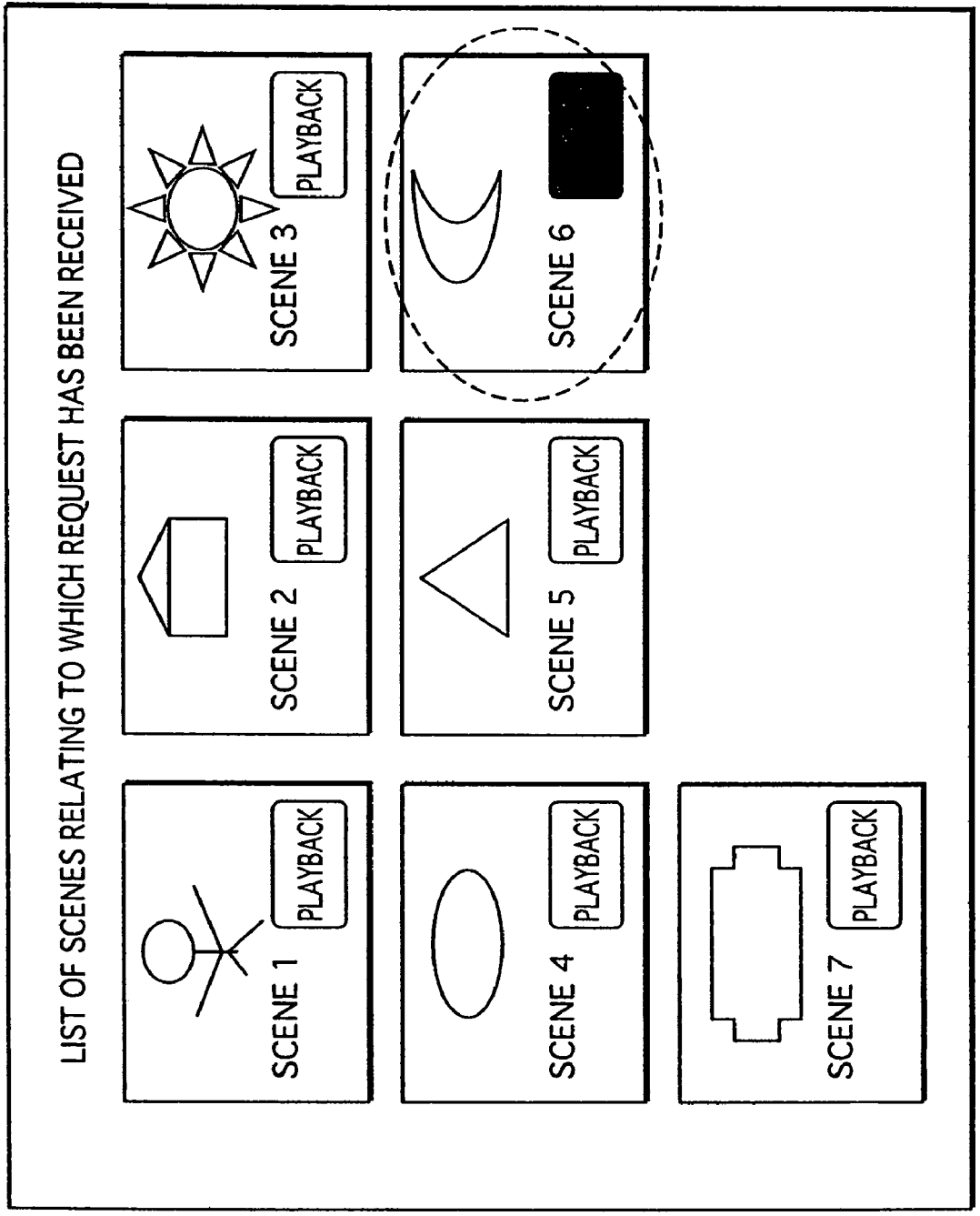

CONTENTS LINKAGE INFORMATION DELIVERY SYSTEM

BACKGROUND OF THE INVENTION (1) Field of the Invention

The present invention relates to content playback technology. More particularly, the present invention relates to a contents linkage information delivery system which allows a user to receive a related content that is associated with a specific playback position of another content.

(2) Description of the Related Art

With the prevalence of large-capacity recording mediums, it is now common practice to distribute recording mediums storing contents such as music and movies in digital form. Further, the recent prevalence of having a continuous connection to the Internet allows users to acquire, via a communications channel, contents according to their detailed interests. When delivering a content stored on a recording medium, the following advantage may be achieved. That is, with the use of a large-capacity recording medium such as a CD or a DVD, a large amount of contents may be provided all at once in high quality. On the other hand, when delivering a content via a communications channel, the following advantage may be achieved. That is, owing to bidirectional communications offered between users and a content provider by, for example, a WWW service, the content provider can provide contents that closely relates to interests of each user. Accordingly, by appropriately combining the two delivery methods, contents may be delivered taking advantages of both methods. What is important when combining the two methods is how to associate a content provided on a recording medium and a content provided via a communications channel. One known contents linkage technique is to associate an HTML (Hyper Text Markup Language) content recorded on an optical disc to an HTML content stored on a server (See for example, Japanese unexamined patent application 09-307859. The technique is briefly described below.

HTML contents are basically composed of text data, image data, and link information showing playback procedure of the data. Suppose a recording medium has an HTML content recorded thereon, and a user plays back the HTML content according to the link information recorded on the recording medium. The link information recorded on the recording medium additionally includes links to HTML contents stored on the server which is connected via a communications channel, so that the HTML contents are provided with increased interactivity. With this arrangement, the user can acquire and play back HTML contents listed in the link information recorded on the recording medium. As described above, this technique is to associate an HTML content on a recording medium with related HTML contents on the server using link information contained in the HTML content on the recording medium.

PROBLEMS TO BE SOLVED BY PRESENT INVENTION

The prior art technique described above is limited to a case where a content, such as an HTML content, recorded on a recording medium includes link information to related contents. With the above prior art technique, when a content recorded on a recording medium is a movie or audio content that does not include link information to related contents, it is impossible to associate the content recorded on the recording medium with related contents that are accessible via a communications channel. However, there is a demand for such a technique. For example, when a DVD stores a movie content, a user who has purchased the DVD plays back the movie content for viewing. Here, suppose it is possible to acquire, via the Internet, information regarding stores selling furniture that appears in the movie, or a still image of a scene of the movie as wall-paper for a mobile phone. If these advantages are realized, the user is offered a great deal of convenience as he can acquire, additionally to a high-quality content from the DVD, related contents that meet detailed requests of the user via the Internet. In view of the above, in a future content delivery system, it is assumed that some contents are delivered in form of a recording medium such as DVD and some contents are delivered via a communications channel such as the Internet. Here, users are allowed to acquire, via the Internet, a content that is associated with a content recorded on a recording medium such as DVD, so that the users are offered a great deal of convenience.

SUMMARY OF THE INVENTION

In view of the above problems, the present invention aims to provide a contents linkage information delivery system for delivering, via a communications channel, a related content that is associated with a content recorded on a recording medium in response to a user request. The contents linkage information delivery system is applicable even if the recorded content is not an HTML content including link information showing links to the related contents, but a video or audio content without such link information. With the contents linkage information delivery system according to the present invention, a content recorded on a recording medium is not required to include link information embedded therein. Accordingly, there is a significant effect that the present invention is applicable to existing DVDs and CDs storing movie contents and music contents that include no link information.

To solve the above problem, a first aspect of the invention is directed to a contents linkage information delivery system for delivering a related content that is associated with another content. The contents linkage information delivery system includes a first playback apparatus for playing back another content, a server for transmitting the related content, and a second playback apparatus for playing back the related content. The first playback apparatus, the server, and the second playback apparatus mutually communicate via a communications channel. The first playback apparatus includes a playback position information acquisition unit operable to acquire time-base playback position information of the another content, a request input unit operable to receive a request from a user, and a first transmission unit operable to transmit, based on the request, the acquired time-base playback position information. The sever includes a first reception unit operable to receive the time-base playback position information transmitted from the first playback apparatus, a related content acquisition unit operable to acquire the related content based on the time-base playback position information and a second transmission unit operable to transmit the acquired related content. The second playback apparatus includes a second reception unit operable to receive the related content transmitted from the server, and a first output unit operable to output the received related content.

Further, a second aspect of the invention is directed to the contents linkage information delivery system according to the first aspect. Here, the first playback apparatus may further include an elapsed-time measurement unit operable to measure an elapsed time between a start of playback of the another content and a reception of the request, and the time-base playback position information may be derived based on the elapsed time.

Still further, a third aspect of the invention is directed to the contents linkage information delivery system according to the second aspect. Here, the elapsed-time measurement unit may measure the elapsed time based on a time of day at which the playback of the another content is started and a time of day at which the request is received.

Still further, a fourth aspect of the invention is directed to the contents linkage information delivery system according to the second aspect. Here, said another content may include time information showing an elapsed time since the start of the playback. The elapsed-time information measurement unit may measure the elapsed time based on the time information.

Still further, a fifth aspect of the invention is directed to the contents linkage information delivery system according to any of the first-fourth aspects. Here, the time-base playback position information may further include a content identifier identifying a content. The related content acquisition unit may acquire the related content based on the time-base playback position information and the content identifier.

Still further, a sixth aspect of the invention is directed to the contents linkage information delivery system according to any of the first-fifth aspects. Here, the first playback apparatus may further include a second output unit operable to output the another content on a display screen. The request further may include display-position specifying information that specifies a section of said another content on the display screen. The time-base playback position information may further include the display-position specifying information.

Still further, a seventh aspect of the invention is directed to the contents linkage information delivery system according to any of the first-sixth aspects. Here, the related content may be the specified section of the another content.

Still further, an eighth aspect of the invention is directed to the contents linkage information delivery system according to any of the first-sixth aspects. Here, the related content may be information providing additional explanation of the another content.

Still further, a ninth aspect of the invention is directed to the contents linkage information delivery system according to any of the first-eight aspects. Here, the time-base playback position information may further include a user identifier identifying a user. The server may perform billing so that the user identified by the user identifier is charged for the related content in accordance with usage of the related content.

Still further, a tenth aspect of the invention is directed to the contents linkage information delivery system according to any of the first-ninth aspects. Here, the server may store therein a related content group composed of the related content as well as a plurality other related contents. Each related content may be stored along with a corresponding piece of time-base playback position information. The related content acquisition unit may acquire the related content from the related content group.

Still further, an eleventh aspect of the invention is directed to the contents linkage information delivery system according to any of the first-ninth aspects. Here, the related content acquisition unit may acquire the related content from an external source via the communications channel.

Still further, a twelfth aspect of the invention is directed to the contents linkage information delivery system according to any of the first-eleventh aspects. Here, the first playback apparatus and the second playback apparatus may be one and the same apparatus.

Still further, a thirteenth aspect of the invention is directed to the contents linkage information delivery system according to any of the first-twelfth aspects. Here, the another content may be distributed in form of a recording medium.

Still further, a fourteenth aspect of the invention is directed to the contents linkage information delivery system according to any of the first-twelfth aspects. Here, the another content may be distributed via the communications channel.

Alternatively, to solve the above problem, a fifteenth aspect of the invention is directed to the contents linkage information delivery system for delivering a related content that is associated with another content. The contents linkage information delivery system includes a playback apparatus for playing back the another content based on time-base playback position information and a server for transmitting the time-base playback position information. The playback apparatus and the server mutually communicate via a communications channel. The playback apparatus includes a first reception unit operable to acquire the related content from the server a request input unit operable to receive a request from a user and a playback position determination unit operable to determine, based on the request and the related content, a starting position of the playback of the another content. The server includes a first transmission unit operable to transmit the related content.

Further, a sixteenth aspect of the invention is directed to the contents linkage information delivery system according to the fifteenth aspect. Here, the related content may include time-base playback position information used for determining, in terms of a playback time, the playback starting position of the playback of the another content.

Still further, a seventeenth aspect of the invention is directed to the contents linkage information delivery system according to the fifteenth aspect. Here, the another content may be recorded on a recording medium. The related content may include time-base playback position information used for determining the playback starting position of said another content recorded on the recording medium.

Still further, an eighteenth aspect of the invention is directed to the contents linkage information delivery system according to any of the fifteenth-seventeenth aspects Here, the playback apparatus may further include a related content request input unit operable to receive, from the user, a related-content request requesting the related content and a second transmission unit operable to transmit the related-content request to the server. The server may include a second reception unit operable to receive the user-inputted related-content request and a determination unit operable to determine whether to transmit the related content based on the related-content request.

Still further, a nineteenth aspect of the invention is directed to the contents linkage information delivery system according to any of the fifteenth-eighteenth aspect. Here, the playback apparatus may include a linkage unit operable to output a linkage content that is associatively composed of the related content and the another content and an output unit operable to output the linkage content.

Still further, a twentieth aspect of the invention is directed to the contents linkage information delivery system according to the nineteenth aspect. Here, the linkage unit may output the linkage content by associatively playing back said another content on a part of a display screen and the related content on another part of the display screen.

Still further, a twenty-first aspect of the invention is directed to the contents linkage information delivery system according to any of the eighteenth-twentieth aspects. Here, the related-content request may include a content identifier identifying the another content and the determination unit transmits the related content based on the content identifier and the related-content request.

Still further, a twenty-second aspect of the invention is directed to the contents linkage information delivery system according to any of the fifteenth-twenty-first aspects. Here, the output unit may play back said another content on a display screen. The related content may further include display-position specifying information that specifies a section of the another content on the display screen. The linkage unit outputs the related content associatively with the display-position specifying information.

Still further, a twenty-third aspect of the invention is directed to the contents linkage information delivery system according to any of the fifteenth-twenty-first aspects. Here, the related content may further include information providing additional explanation of said another content.

Still further, a twenty-fourth aspect of the invention is directed to the contents linkage information delivery system according to any of the fifteenth-twenty-third aspects. Here, the related-content request may further include a user identifier identifying a user. The server may perform billing so that the user identified by the user identifier is charged for the related content in accordance with usage of the related content.

Still further, a twenty-fifth aspect of the invention is directed to the contents linkage information delivery system according to any of the fifteenth-twenty-fourth aspects. Here, the server may further store therein a related content group composed of the related content as well as a plurality of other related contents and include a related content acquisition unit operable to acquire the related content from the related content group.

Still further, a twenty-sixth aspect of the invention is directed to the contents linkage information delivery system according to any of the fifteenth-twenty-fourth aspects. Here, the server may further include a related content acquisition unit operable to acquire the related content from an external source via the communications channel.

Still further, a twenty-seventh aspect of the invention is directed to the contents linkage information delivery system according to any of the fifteenth-twenty-sixth aspects. Here, the another content may be distributed in form of a recording medium.

Still further, a twenty-eight aspect of the invention is directed to the contents linkage information delivery system according to any of the fifteenth-twenty-sixth aspects Here, said another content may be distributed via the communications channel.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 is a view showing an example of content data CNTDATA of embodiment 1;

FIG. 25 is a view showing an example of playback of a first content CNT1 that is associated with playback position information TI2 according to the modification (1) of embodiment 2;

FIG. 26 is a view showing an example of playback of bulletin board information that is associated with a first content CNT1 according to a modification (2) of embodiment 2; and FIG. 27 is a view showing an example of playback, according to modification (2) of embodiment 2, of a list of scenes at which a request has been issued.

DETAILED DESCRIPTION OF THE INVENTION

With reference to the accompanying drawing, the following describes preferred embodiments of a contents linkage information delivery system according to the present invention.

Embodiment 1

Hereinafter, Description is Given to a Contents Linkage information delivery system 1 according to embodiment 1 of the present invention.

Figure 1:
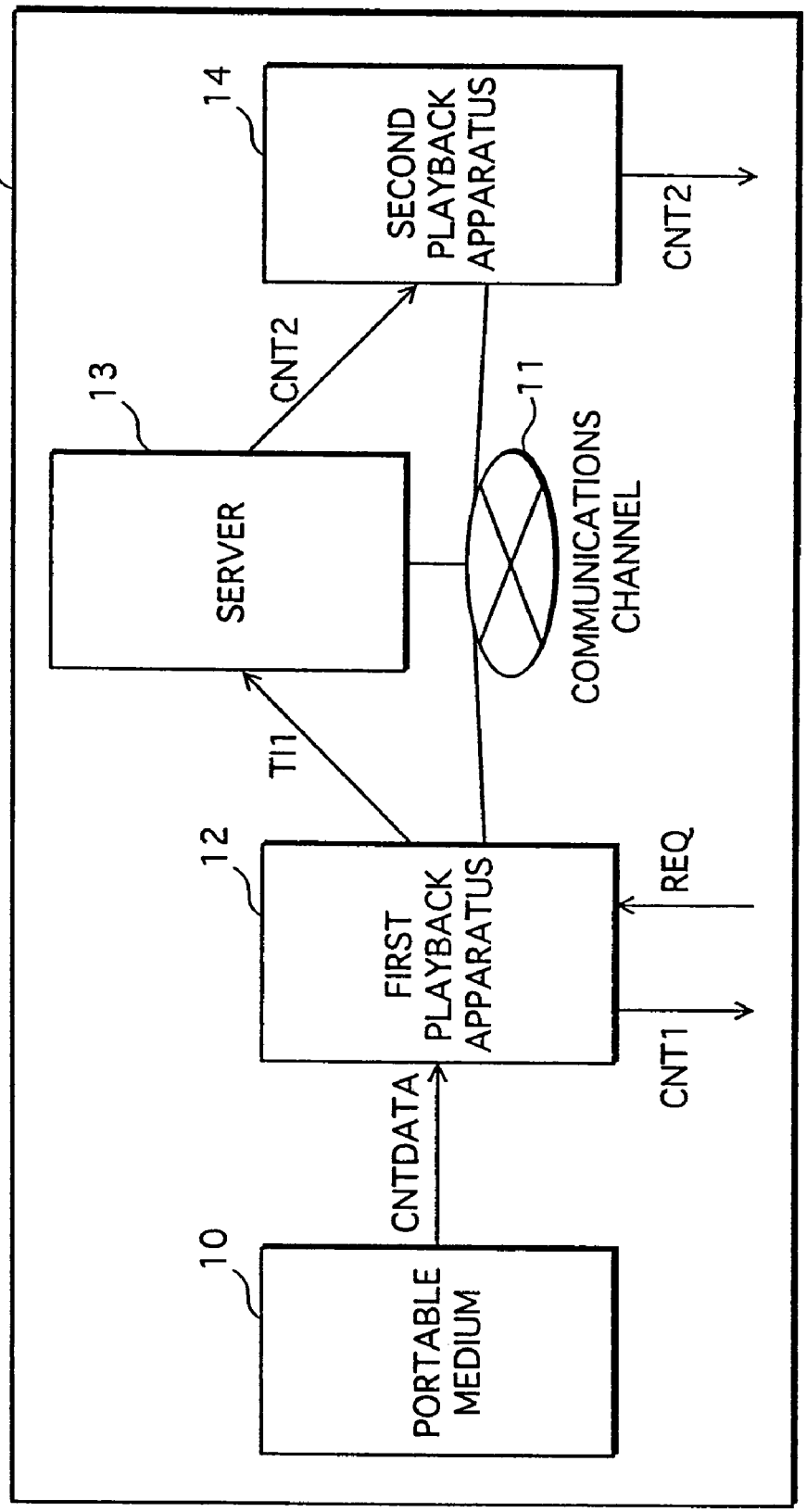
FIG. 1 is a view showing an overview of a contents linkage information delivery system 1 of embodiment 1 according to the present invention.

First, with reference to FIG. 1, an overview of embodiment 1 is given and then a concrete example is described briefly.

In the figure, reference numeral 10 denotes a portable medium, which is a recording medium such as CD-ROM and DVD-ROM having content data CNTDATA recorded thereon. The content data CNTDATA includes a first content CNT1, such as a video content or an audio content, in a format compliant with a later described first playback apparatus. Reference numeral 11 denotes a communications channel, which is a network such as the Internet. Reference numeral 12 is the first playback apparatus which is an apparatus that reads and plays back the first content CNT1 included in the content data CNTDATA recorded on the portable medium 10. The first playback apparatus 12 is provided with functions of generating, upon receipt of a user request REQ from outside, playback position information TI1 based on a position of the first content CNT1 that is currently played back, and then transmitting the thus generated playback position information TI1 to a later-described server via the communications channel 11. Reference numeral 13 denotes the server which receives the playback position information TI1 from the first playback apparatus 12 via the communications channel 11. The playback position information TI1 shows a playback position of which related content is requested by the user. In addition, the server 13 acquires a second content CNT2 based on the received playback position information TI1, and transmits the acquired second content CNT2 to a second playback apparatus 14 via the communications channel 11. Reference numeral 14 denotes the second playback apparatus which is provided with a function of playing back the second content CNT2 received from the server 13 via the communications channel 11.

The contents linkage information delivery system 1 is applicable to where a content provider has delivered content data CNTDATA to a user by way of a recording medium such as a CD-ROM and a DVD-ROM. During playback of a first content CNT1 included in the content data CNTDATA, a user makes a request for a related content that is associated with the first content CNT1 by transmitting, to the server 13, playback position information TI1 showing a playback position of the first content CNT1 to which the requested related content relates. Receiving the playback position information TI1, the server 13 specifies the playback position of the first content CNT1, and transmits the requested related content as a second content CNT2 to the second playback apparatus 14 that is owned by the user who has made the request. As above, the contents linkage information delivery system 1 receives playback position information TI1 transmitted from a playback apparatus owned by a user, so that a content provider is allowed to flexibly deliver a related content that meets a detailed request from the user.

Next, a concrete example embodying the present embodiment is briefly described. A user owns a player (first playback apparatus 12) and a mobile phone (second playback apparatus 14) both connected to the Internet (communications channel 11). The user purchases a packaged medium (portable medium 10) having movie data (content data CNTDATA) recorded thereon, and starts playback, with the player, of a movie content (first content CNT1) included in the movie data. Upon start of the playback, the player initializes a counter value that is used to specify a current playback position, and then increments the counter value by 1 for every second. During the playback of the movie content, the user finds one scene that meets his preference, and thus depresses a capture button on a remote controller of the player. This operation of depressing the capture button is taken as a request REQ. In response, the player generates information showing the playback time (playback position information TI1) based on the counter value held at the time of receiving the request REQ. The player then transmits the playback time information to a content management server (server 13). In response, the content management server transmits, to the mobile phone owned by the user, wall-paper data (second content CNT2) for displaying the user requested scene. The mobile phone then receives the wall-paper data, so that the user can use the received wall-paper data.

This concludes the brief description of a concrete example embodying the present embodiment. Hereinafter, description is given in detail to the contents linkage information delivery system 1 which is one embodiment of the present invention.

<Construction of Contents Linkage Information Delivery System 1>

As shown in FIG. 1, the contents linkage information delivery system 1 is composed of the portable medium 10, the communications channel 11, the first playback apparatus 12, the server 13, and the second playback apparatus 14.

The first playback apparatus 12 plays back a first content CNT1 that is included in the content data CNTDATA recorded on the portable medium 10. Further, in response to an external request, the first playback apparatus 12 transmits to the server 13, playback position information TI1 regarding a playback position of the first content CNT1. Upon receipt of the playback position information TI1 from the first playback apparatus 12, the server 13 delivers to the second playback apparatus 14, a second content CNT2 that is associated with the playback position shown by the received playback position information TI1.

Hereinafter, description is given in detail to the above components. First, the constructions of the portable medium 10 and the communications channel 11 are described. Then, the constructions and operations of the first playback apparatus 12, the server 13, and the second playback apparatus 14 are described.

<Construction of Portable Medium 10>

The portable medium 10 is, for example, a DVD-ROM or a CD-ROM on which a content such as a movie or music has been recorded in advance. In this embodiment, as shown in FIG. 2, the portable medium 10 has recorded thereon content data CNTDATA that is composed of a content identifier CID and a first content CNT1. The content identifier CID is an identifier uniquely identifying the first content CNT1 included in the content data CNTDATA recorded on the portable medium 10. The first content CNT1 is data representing a content in a format readable by the first playback apparatus 12. For example, the first content CNT1 may be video data in MPEG format or music data in MP3 format, while the content identifier CID may be the title of a movie or song, i.e., the first content 1.

<Construction of Communications Channel 11>

The communications channel 11 is a network such as the Internet, a telephone line, or a dedicated line.

<Construction of First Playback Apparatus 12>

Figure 3:
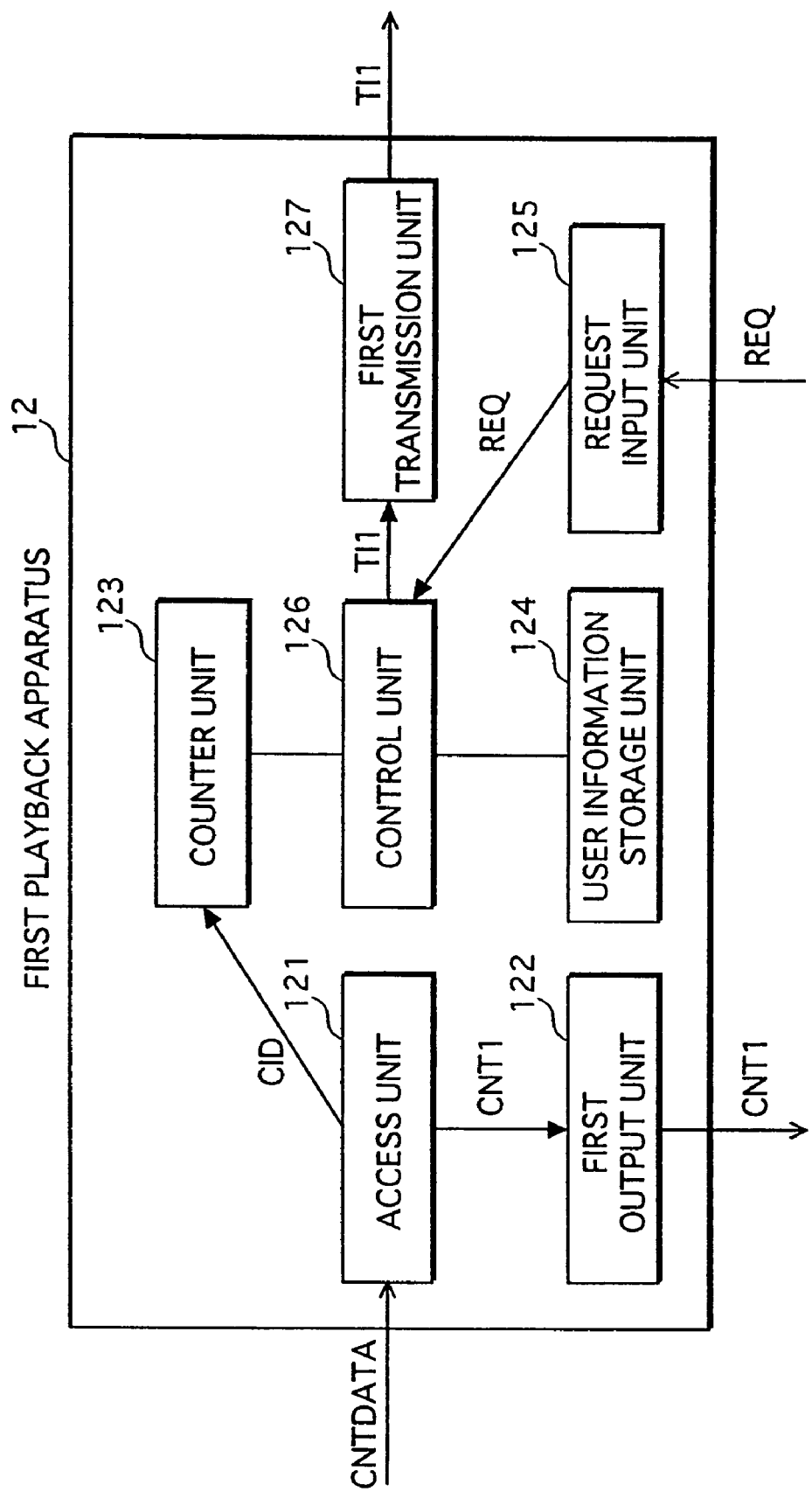
FIG. 3 is a view showing an exemplary construction of a first playback apparatus 12 of embodiment 1.

As shown in FIG. 3, the first playback apparatus 12 is composed of an access unit 121, a first output unit 122, a counter unit 123, a user information storage unit 124, a request input unit 125, a control unit 126, and a first transmission unit 127.

(1) Access Unit 121

To start playback of the portable medium 10, the access unit 121 extracts the content identifier CID from the content data CNTDATA recorded on the portable medium 10, and outputs the extracted content identifier CID to the counter unit 123. The access unit 121 keeps reading the content data CNTDATA to sequentially output the first content CNT1 part by part to the first output unit 122.

(2) First Output Unit 122

The first output unit 122 sequentially receives the first content CNT1 from the access unit 121 and outputs the received part to outside. The first output unit 122 may be provided with a display or a speaker to play back a video content or an audio content. Alternatively, the first output unit 122 may output a content onto the portable medium 10 or another recording medium, or produce printed output.

(3) Counter Unit 123

Figure 4:
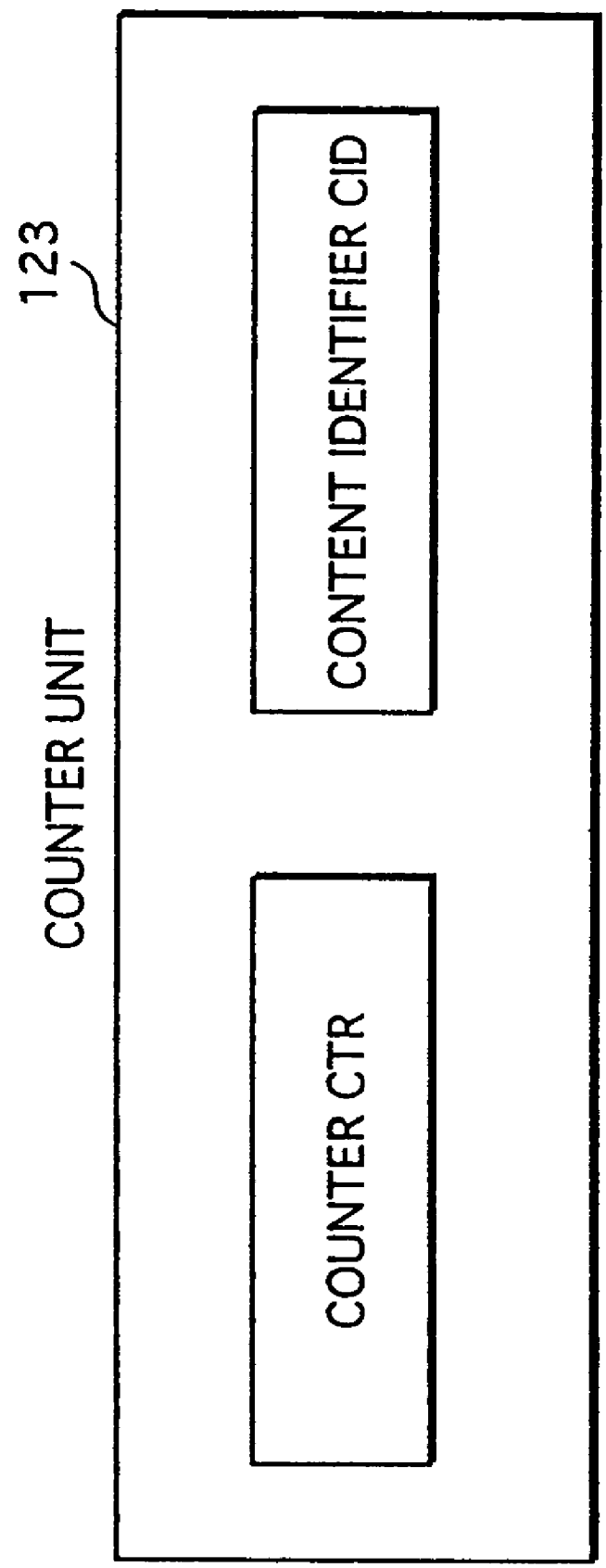
FIG. 4 is a view showing an exemplary construction of a counter unit 123 of embodiment 1.

As shown in FIG. 4, the counter unit 123 holds a content identifier CID and a counter CTR, which is an eight-digit decimal number. The values of the counter CTR and the content identifier CID can be referenced by the control unit 126, and both values are initialized to 0 at the start of playback of the first content CNT1 recorded on the portable medium 10. In addition, when receiving a content identifier CID from the access unit 121, the counter unit 123 stores therein the received content identifier CID, and initializes the counter CTR to zero. The counter unit 123 then automatically increments the counter CTR by one for every predetermined time period, e.g., 1 ms. The counter CTR is, for example, a timecode, which is a time-axis format used for measuring an elapsed time from the start of playback of the content or for synchronizing video data and audio data. Note that the counter CTR is not limited to an eight-digit decimal number, and may be a number in any digits expressed in any numerical system.

(4) User Information Storage Unit 124

Figure 5:
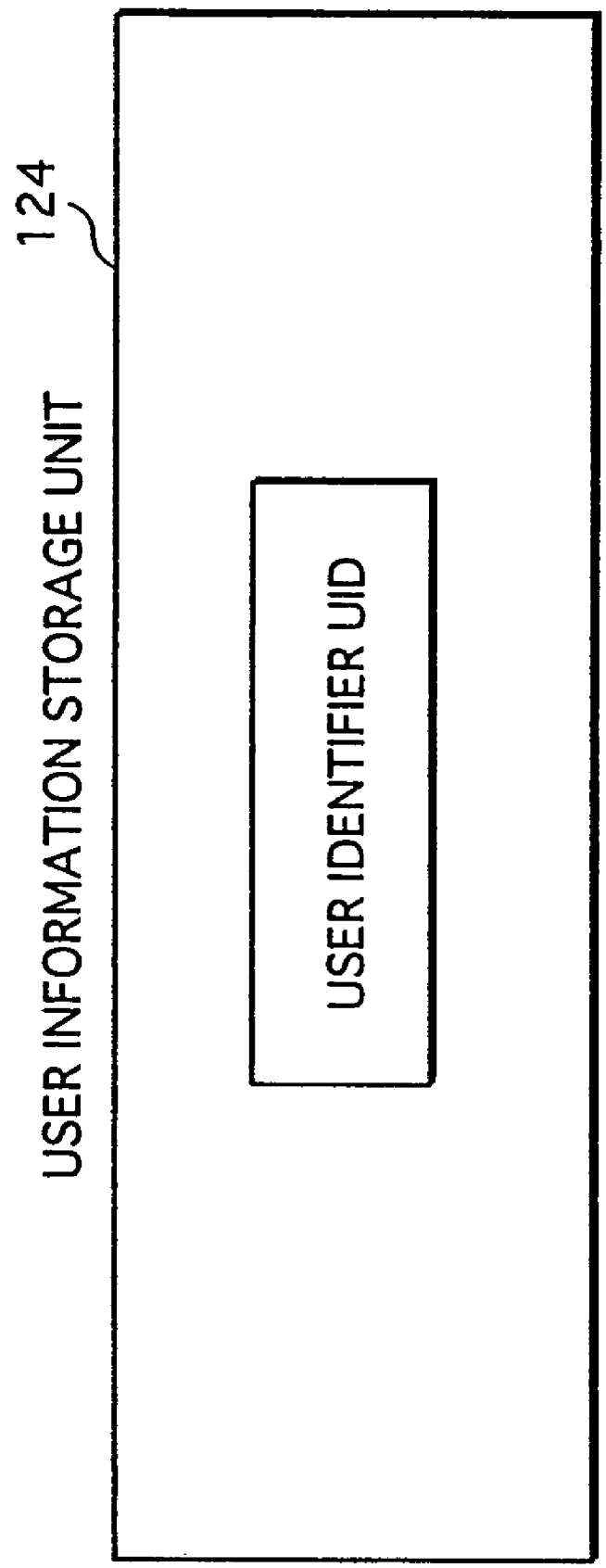
FIG. 5 is a view showing an exemplary construction of a user information storage unit 124 of embodiment 1.

As shown in FIG. 5, the user information storage unit 124 holds a user identifier UID. The user identifier UID is an identifier uniquely identifying a user (owner) of the first playback apparatus 12. For example, the user identifier UID may be assigned to the first playback apparatus 12 at the time of manufacturing, or the user's credit card number.

(5) Request Input Unit 125

The request input unit 125 is to receive an external input of a request REQ. To be more specific, for example, the request input unit 125 is provided with a button, keypad, computer keyboard, or computer mouse. The request REQ is a signal indicative of a user request issued at the push of a button, for example. Upon receipt of a request REQ inputted externally by a user, the request input unit 125 outputs the received request REQ to the control unit 126.

(6) Control Unit 126

Figure 6:
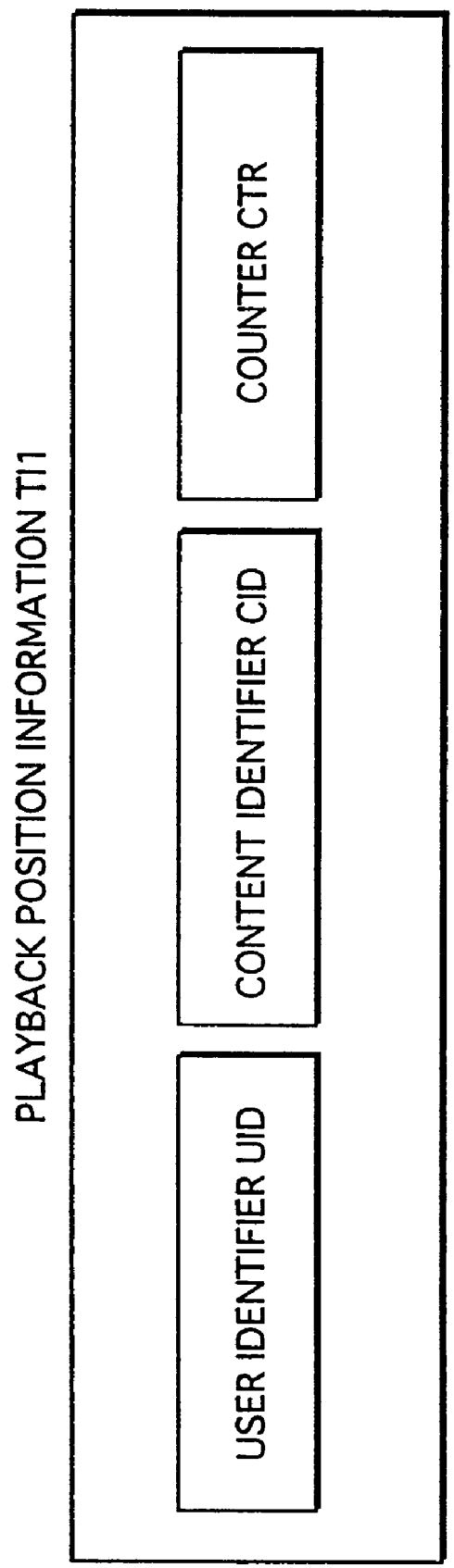
FIG. 6 is a view showing one example of playback position information TI1 of embodiment 1.

Upon receipt of a request REQ from the request input unit 125, the control unit 126 acquires the counter CTR and the content identifier CID both from the counter unit 123, and the user identifier UID from the user information storage unit 124. The control unit 126 then generates playback position information TI1 from the acquired content identifier CID, counter CTR, and user identifier UID. As shown in FIG. 6, the playback position information TI1 is composed of the content identifier CID, the counter CTR, and the user identifier UID. The control unit 126 transmits the thus generated playback position information TI1 to the first transmission unit 127.

(7) First Transmission unit 127

Upon receipt of the playback position information TI1 from the control unit 126, the first transmission unit 127 transmits the received playback position information TI1 to the server 13 via the communications channel 11.

<Operations of First Playback Apparatus 12>

Figure 7:
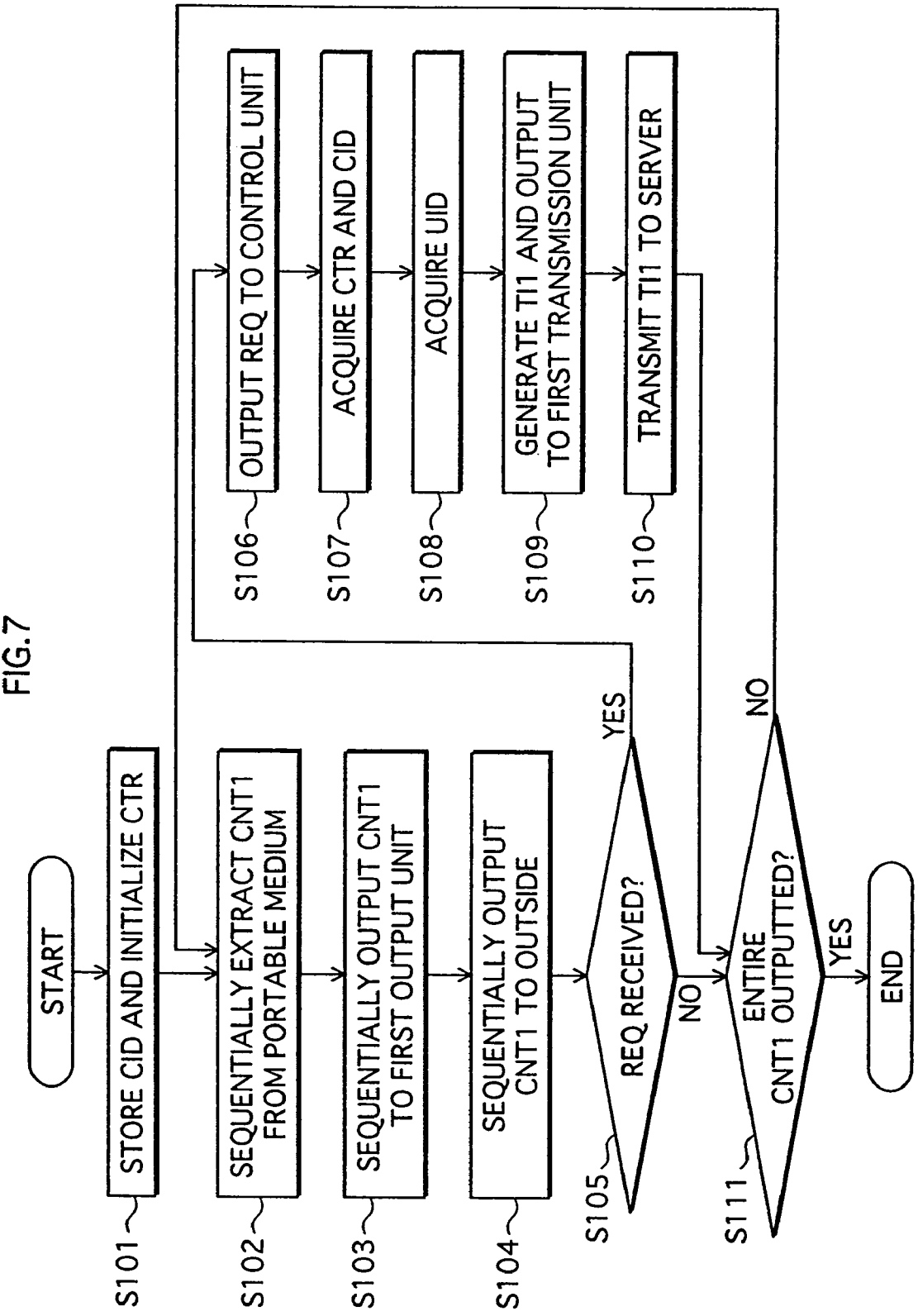
FIG. 7 is a flowchart of operations performed by the first playback apparatus 12 of embodiment 1.

Up to this point, description has been given to the construction of the first playback apparatus 12. Now, description is given to operations of the first playback apparatus 12. First, in response to initialization of the counter CTR held in the counter unit 123, the first playback apparatus 12 causes the counter unit 123 to automatically increment the counter CTR by one for every predetermined time period, e.g., 1 ms. Independently of the operation performed regarding the counter CTR held by the counter unit 123, the first playback apparatus 12 performs the operations shown in a flowchart in FIG. 7.

First, the access unit 121 extracts the content identifier CID from the content data CNTDATA recorded on the portable medium 10, and outputs the extracted content identifier CID to the counter unit 123. The counter unit 123 stores therein the received content identifier CID, and initializes the counter CTR (step S101).

The access unit 121 sequentially extracts the first content CNT1 part by part from the content data CNTDATA recorded on the portable medium 10 (step S102).

The access unit 121 sequentially outputs the extracted first content CNT1 to the first output unit 122 (step S103).

Next, the first output unit 122 sequentially outputs the first content CNT1 received from the access unit 121 to the outside (step S104).

Next, in the case where the request input unit 125 has not yet received an external input of a request REQ, the processing goes onto a step S111 described below. On the other hand, in the case where the request input unit 125 has received a request REQ, the processing goes onto a step S106 (step S105).

The request input unit 125 then outputs the received request REQ to the control unit 126 (step S106).

The control unit 126 acquires the counter CTR and the content identifier CID from the counter unit 123 (step S107).

The control unit 126 further acquires a user identifier UID from the user information storage unit 124 (step S108).

The control unit 126 generates playback position information TI1 from the counter CTR, the content identifier CID, and the user identifier UID, and outputs the generated playback position information TI1 to the first transmission unit 127 (step S109).

Next, the first transmission unit 127 transmits the playback position information TI1 received from the control unit 116 to the server 13 via the communications channel 11 (step S110).

The access unit 121 terminates the processing upon completing the output of the entire first content CNT1 included in the content data CNTDATA to the first output unit 122. On the other hand, when the first content CNT1 included in the content data CNTDATA has not yet been played back completely, the processing goes back to the step S102 (step S111).

This concludes description of the construction and operations of the first playback apparatus 12, which is one component of the contents linkage information delivery system 1. Next, description is given to the construction and operations of the server 13.

<Construction of Server 13>

Figure 8:
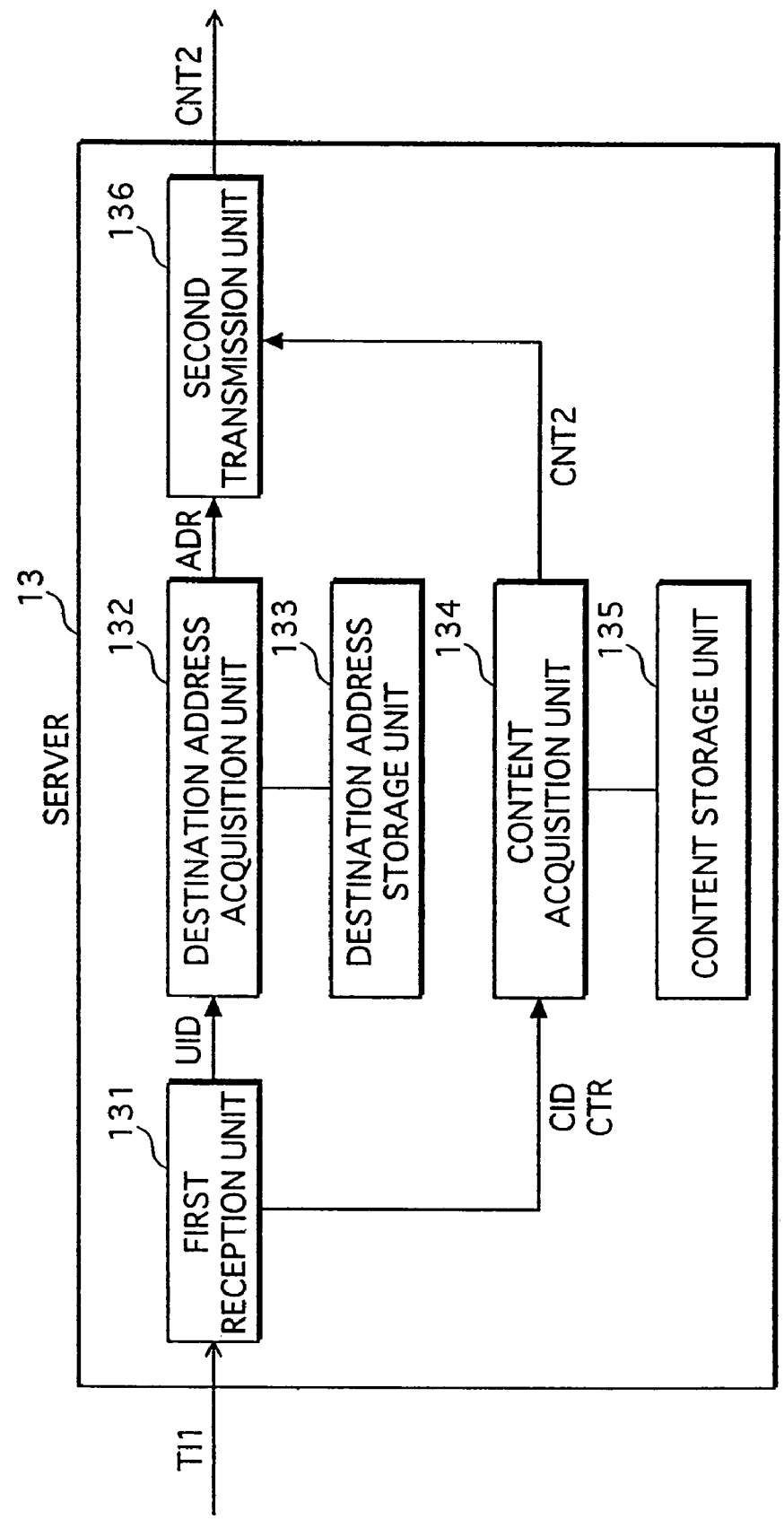
FIG. 8 is a view showing an exemplary construction of a server 13 of embodiment 1.

As shown in FIG. 8, the server 13 is composed of a first reception unit 131, a destination address acquisition unit 132, a destination address storage unit 133, a content acquisition unit 134, a content storage unit 135, and a second transmission unit 136.

(1) First Reception Unit 131

Upon receiving playback position information TI1 from the first playback apparatus 12 via the communications channel 11, the first reception unit 131 extracts a user identifier UID, a content identifier CID, and a counter CTR from the received playback position information TI1. The first reception unit 131 then outputs the extracted user identifier UID to the destination address acquisition unit 132, and transmits the extracted content identifier CID and counter CTR to the content acquisition unit 134.

(2) Destination Address Acquisition Unit 132

Figure 9:
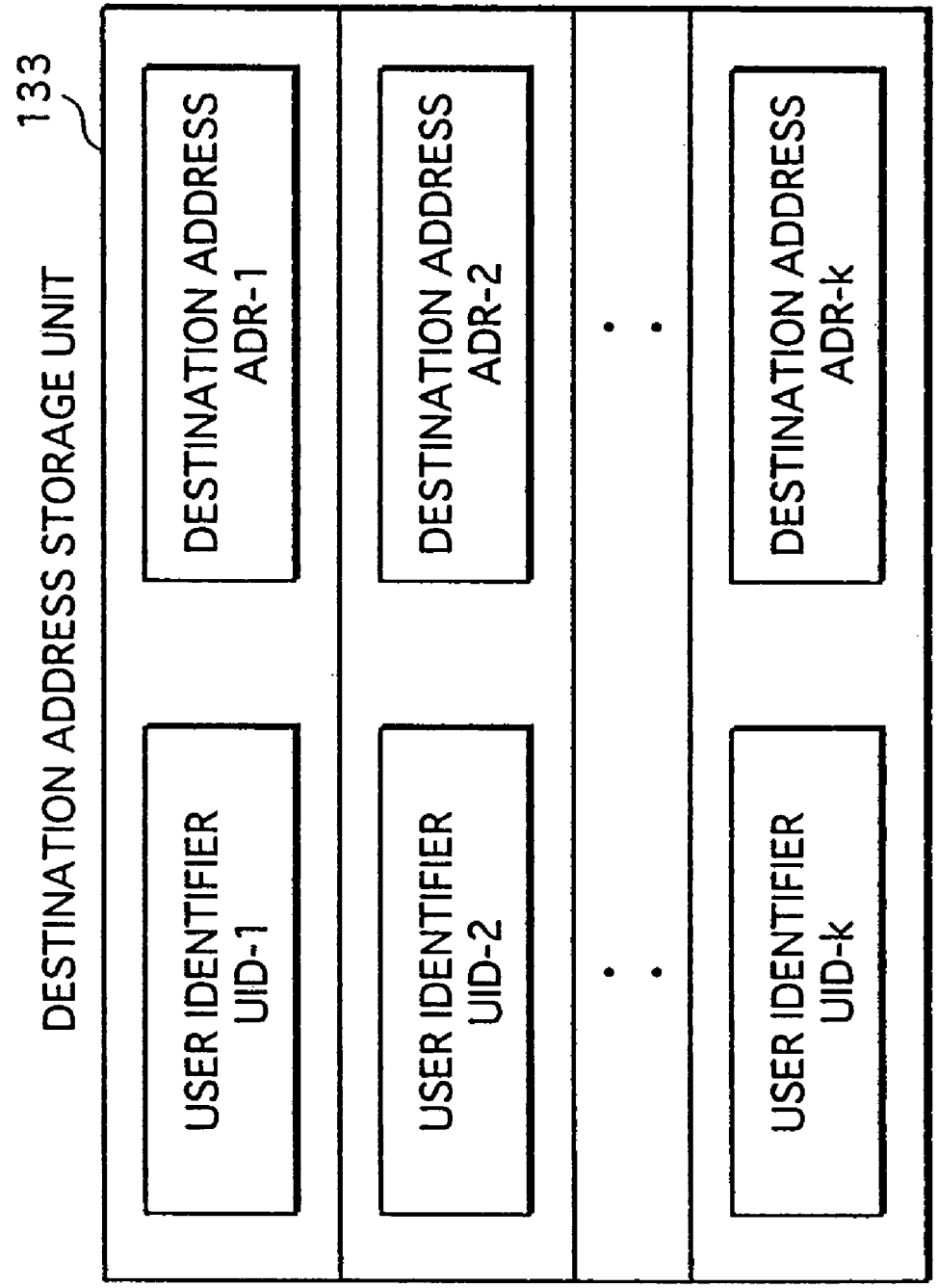
FIG. 9 is a view showing an exemplary construction of a destination address storage unit 133 of embodiment 1.

The destination address acquisition unit 132 receives the user identifier UID from the first reception unit 131. Upon receipt, the destination address acquisition unit 132 makes an access to the destination address storage unit 133, which is shown in FIG. 9, to acquire a destination address ADR that corresponds to the received user identifier UID. The destination address ADR is information uniquely specifying the address of the second playback apparatus 14, and examples include an internet mail address and an IP address. The destination address acquisition unit 132 then outputs the acquired destination address ADR to the second transmission unit 136.

(3) Destination Address Storage Unit 133

As shown in FIG. 9, the destination address storage unit 133 stores destination addresses ADR in a one-to-one correspondence with user identifiers UID. In FIG. 9, the user identifier UID-1 corresponds to the destination address ADR-1, the user identifier UID-2 to the destination address ADR-2, and the user identifier UID-k to the destination address ADR-k. Accordingly, it is possible to specify a destination address ADR that corresponds to the received user identifier UID. The specified destination address ADR, in other words, is an address of the second playback apparatus 14, which is owned by the user corresponding to the received user identifier UID. The destination address acquisition unit 132 accesses the destination address storage unit 133 to acquire a destination address ADR that corresponds to the received user identifier UID. Each user preliminary registers, in the destination address storage unit 133, a user identifier UID together with a corresponding destination address ADR. To this end, for example, the users have sent and register their user identifiers UID and destination addresses ADR by mail or by a WEB service.

(4) Content Acquisition Unit 134

Figure 10:
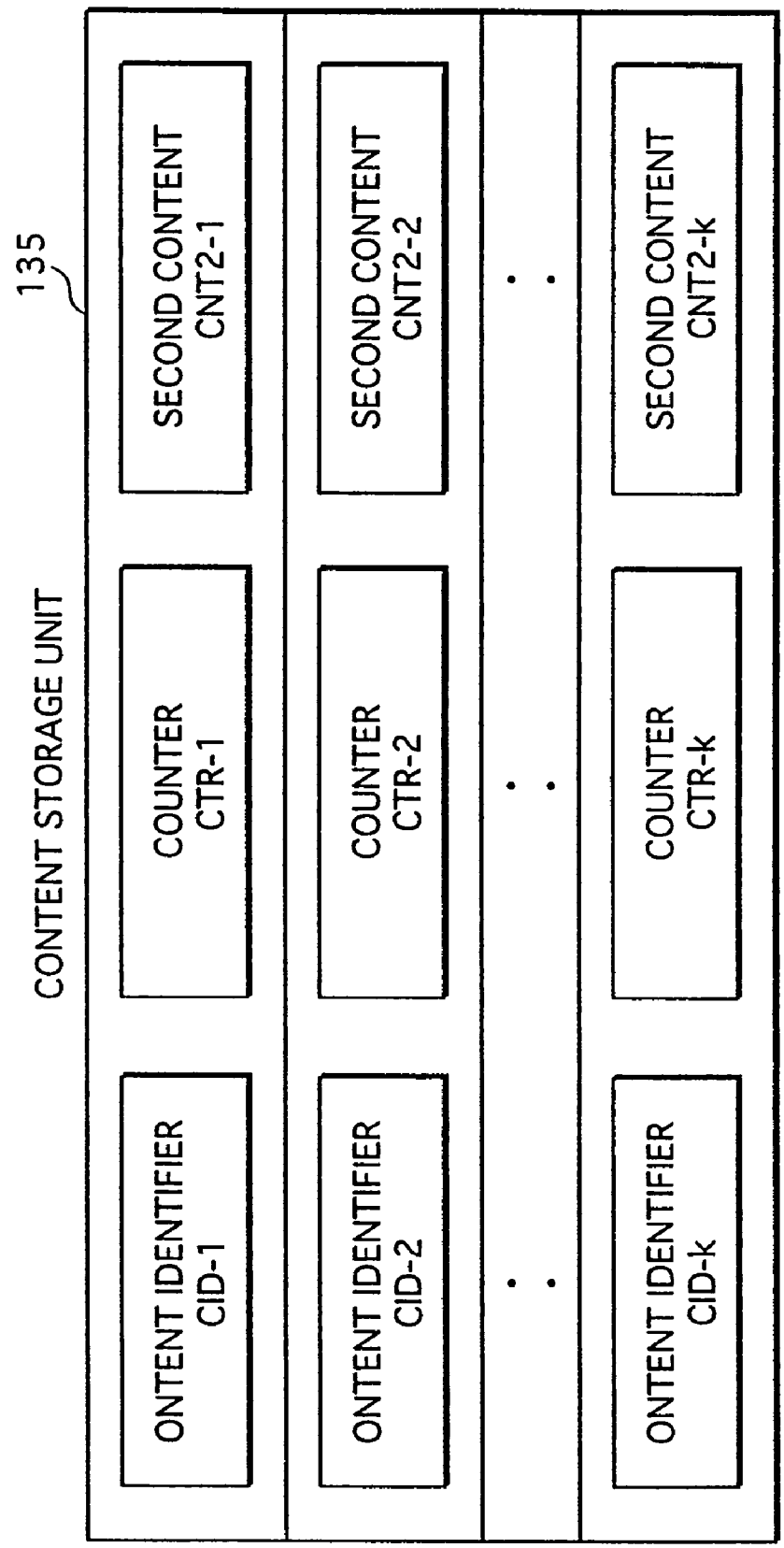
FIG. 10 is a view showing an exemplary construction of a content storage unit 135 of embodiment 1.

The content acquisition unit 134 receives a content identifier CID and a counter CTR from the first reception unit 131. With reference to the received content identifier CID and counter CTR, the content acquisition unit 134 acquires a second content CNT2 from the content storage unit 135, which is shown in FIG. 10. The second content CNT2 is a related content that is associated with the first content CNT1 identified by the content identifier CID at a part corresponding to the playback position shown by the counter CTR. The second content CNT2 is in a format readable to the second playback apparatus 14. For example, the second content CNT2 may be wall-paper data, still image data, or relatively short video clip data of a scene included in a movie. The content acquisition unit 134 then outputs the acquired second content CNT2 to the second transmission unit 136.

(5) Content Storage Unit 135

As in an example shown in FIG. 10, the content storage unit 135 stores second contents CNT2 in a one-to-one correspondence with pairs each made up of a content identifier CID and a counter CTR. The content storage unit 135 is accessible from the content acquisition unit 134. In the example shown in FIG. 10, the pair of the content identifier CID-1 and the counter CTR-1 corresponds to the second content CNT2-1, the pair of the content identifier CID-2 and the counter CTR-2 to the second content CNT2-2, and the pair of the content identifier CID-k and the counter CTR-k to the second content CNT2-k. The content identifiers CID, the counters CTR, and the second content CNT2 stored in the content storage unit 135 are the ones registered in advance by the content provider.

For example, a movie content provider generates pieces of wall-paper data from movie scenes, and each piece of wall paper data is stored along with a corresponding movie title and playback position information.

(6) Second Transmission Unit 136

The second transmission unit 136 receives a destination address ADR and a second content CNT2 from the destination address acquisition unit 132 and the content acquisition unit 134, respectively. Based on the received destination address ADR, the second transmission unit 136 uniquely specifies the second playback apparatus 14 being the transmission destination, and transmits the received second content CNT2 to the specified second playback apparatus 14.

<Operations of Server 13>

Figure 11:
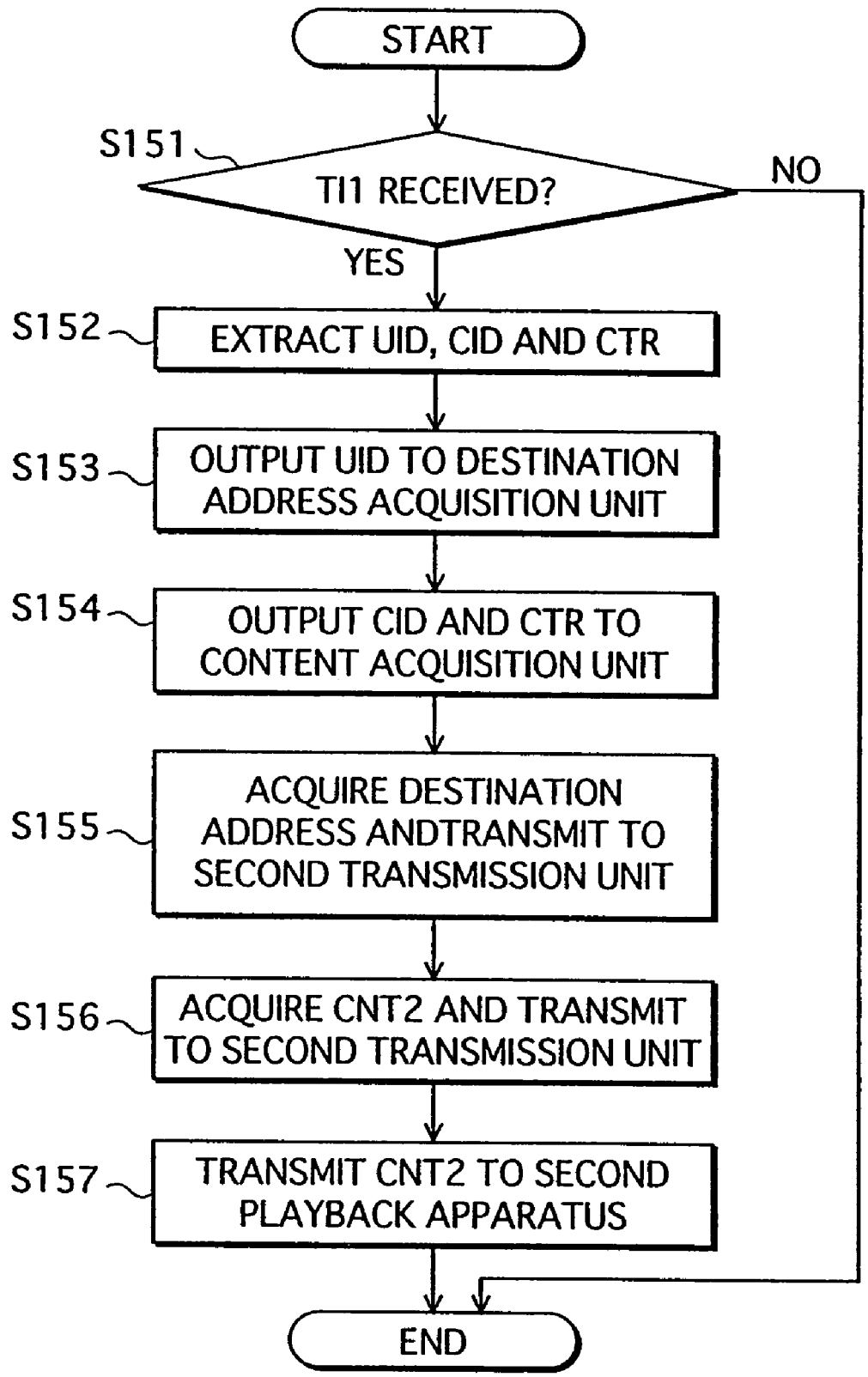
FIG. 11 is a flowchart of operations performed by the server 13 of embodiment 1.

Up to this point, the construction of the server 13 has been described. Now, description is given to the operations of the server 13 with reference to the flowchart shown in FIG. 11.

First, in the case where the first reception unit 131 has not yet received playback position information TI1 from the first playback apparatus 12 via the communications channel 11, the server 13 terminates the processing. Upon receipt of playback position information TI1 by the first reception unit 131 from the first playback apparatus 12 via the communications channel 11, the server 13 moves onto a step S152 described below (step S151).

Next, the first reception unit 131 extracts a user identifier UID, a content identifier CID, and a counter CTR from the received playback position information TI1 (step S152).

The first reception unit 131 then outputs the extracted user identifier UID to the destination address acquisition unit 132 (step S153).

In addition, the first reception unit 131 outputs the extracted content identifier CID and counter CTR to the content acquisition unit 134 (step S154).

Next, the destination address acquisition unit 132 makes an access to the destination address storage unit 133 to acquire, as a destination address, the address of the second playback apparatus 14, which is owned by the user corresponding to the user identifier UID that is received from the first reception unit 131. The destination address acquisition unit 132 then transmits, to the second transmission unit 136, the thus acquired destination address ADR (step S155).

Next, the content acquisition unit 134 makes an access to the content storage unit 135, based on the received content identifier CID and counter CTR, to acquire a corresponding second content CNT2, and outputs the acquired second content CNT2 to the second transmission unit 136 (step S156).

The second transmission unit 136 receives the destination address ADR and the second content CNT2 from the destination address acquisition unit 132 and the content acquisition unit 134, respectively. Based on the received destination address ADR, the second transmission unit 136 uniquely specifies the second playback apparatus 14 being the transmission destination, and transmits the second content CNT2 to the specified second playback apparatus 14 (step S157).

This concludes the description of the construction and operations of the server 13, which is one component of the contents linkage information delivery system 1. Hereinafter, description is given to the construction and operations of the second playback apparatus 14.

<Construction of Second Playback Apparatus 14>

Figure 12:
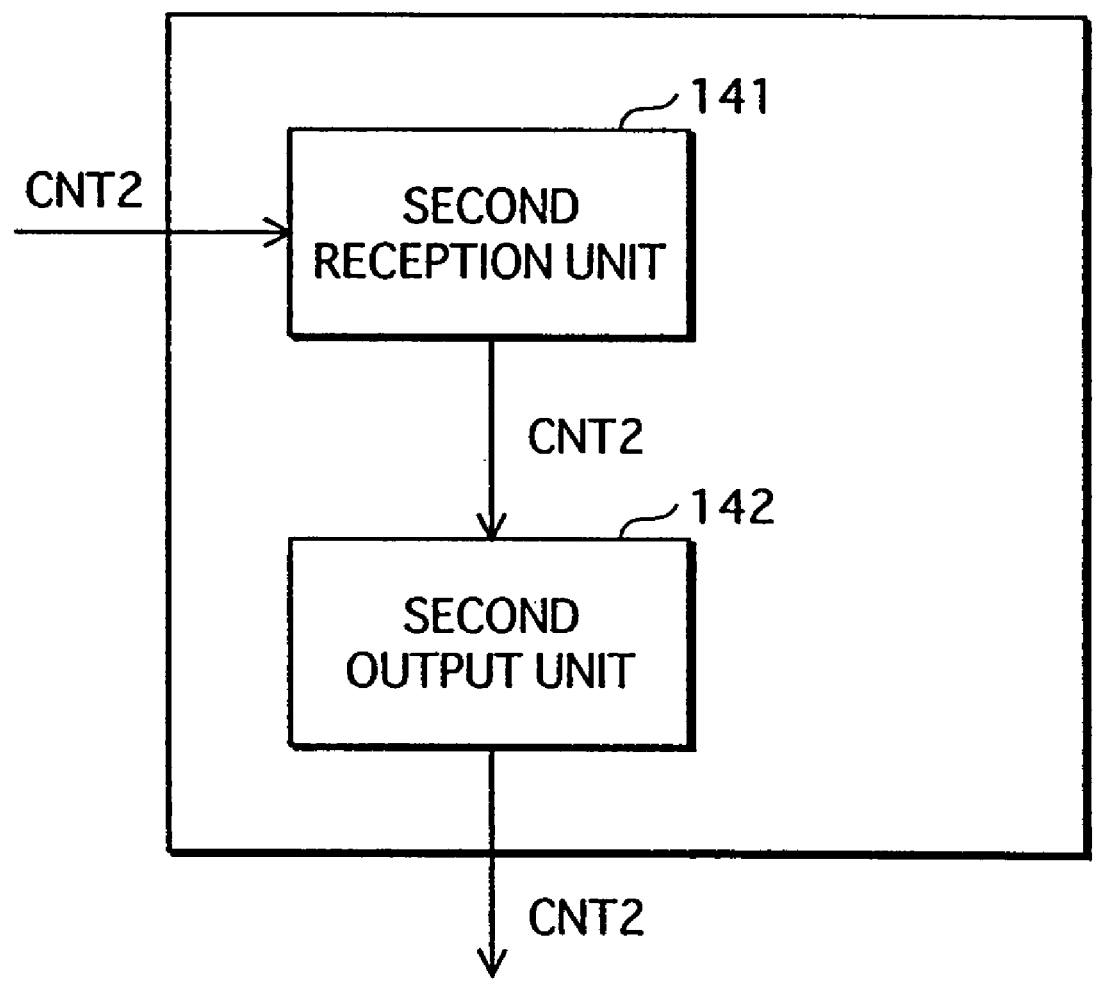
FIG. 12 is a view showing an exemplary construction of a second playback apparatus 14 of embodiment 1.

As shown in FIG. 12, the second playback apparatus 14 is composed of a second reception unit 141 and a second output unit 142.

(1) Second Reception Unit 141

When receiving a second content CNT2 from the server 13, the second reception unit 141 transmits the received second content CNT2 to the second output unit 142.

(2) Second Output Unit 142

The second output unit 142 sequentially outputs a second content CNT2 transmitted from the second reception unit 141. The second output unit 142 may include a display and a speaker to output video and audio contents. Alternatively, the second output unit 142 may output a content onto the portable medium 10 or another recording medium, or produce a printed output.

<Operations of Second Playback Apparatus 14>

Figure 13:
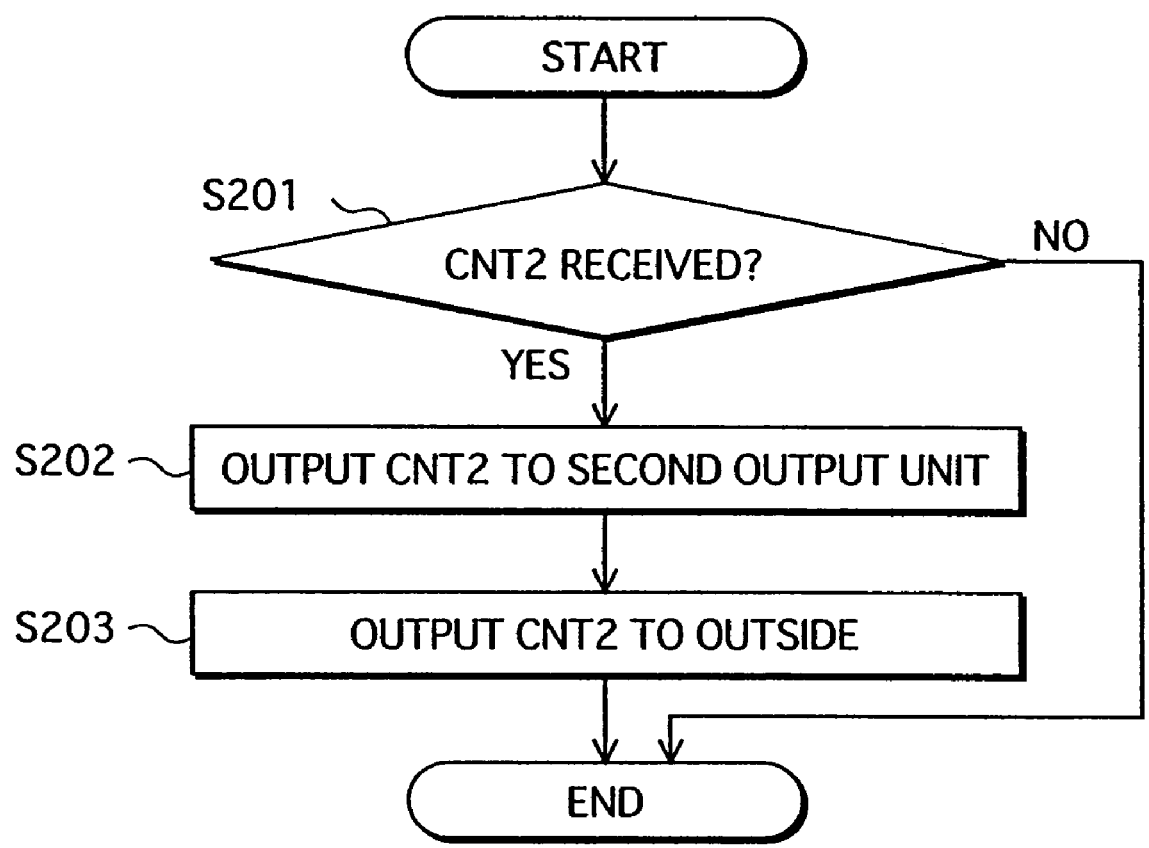
FIG. 13 is a flowchart of operations performed by the second playback apparatus 14 of embodiment 1.

Up to this point, the construction of the second playback apparatus 14 has been descried. Hereinafter, description is given to the operations of the second playback apparatus 14 with reference to the flowchart shown in FIG. 13.

First, in the case where the second reception unit 141 has not yet received a second content CNT2 from the server 13, the second playback apparatus 14 terminates the processing. Upon receipt of a second content CNT2 by the second reception unit 141 from the server 13, the processing moves onto a step S202 described below (step S201).

Next, the second reception unit 141 outputs the received second content 14 to the second output unit 142 (step S202).

The second output unit 142 plays back the second content CNT2 received from the second reception unit 141 (step S203).

<Effect of Contents Linkage Information Delivery System 1>

Up to this point, description has been given to the embodiment of the contents linkage information delivery system 1. The contents linkage information delivery system 1 is so constructed that the first playback apparatus 12 plays back a first content CNT1 included in content data CNTDATA, and transmits to the server 13, playback position information TI1 specifying a position of the first content CNT1 currently being played back. In response, the server 13 transmits, with reference to the received playback position information TI1, a second content CNT2 requested by a user. The second playback apparatus 14 thus receives the second content CNT2 that meets the user request. With this construction, a content provider is allowed to flexibly provide content meeting detailed requests of users.

<Modifications>

The embodiment described above is one example of the present invention, and the present invention is in no way limited to this specific embodiment. It is apparent that various changes and modifications may be made without departing from the gist of the present invention. The following modifications are also considered to fall within the scope of the present invention.

(1) The first playback apparatus 12 may be so constructed that the control unit 126 instructs causes to transmit playback position information TI1 to the server 13 regardless of whether the request input unit 125 has received an external input of a request REQ. For example, during playback of a movie, the player may transmit playback position information TI1 to the server 13 continually or at regular internals of ten seconds. With this construction, the second playback apparatus 14 is allowed to acquire a related content without requiring the user to input a request REQ to the first playback apparatus 12. Further, the second playback apparatus 14 is allowed to sequentially play back a related content, i.e., a second content CNT2 associatively with a first content CNT1 being played back by the first playback apparatus 12.

Figure 14:
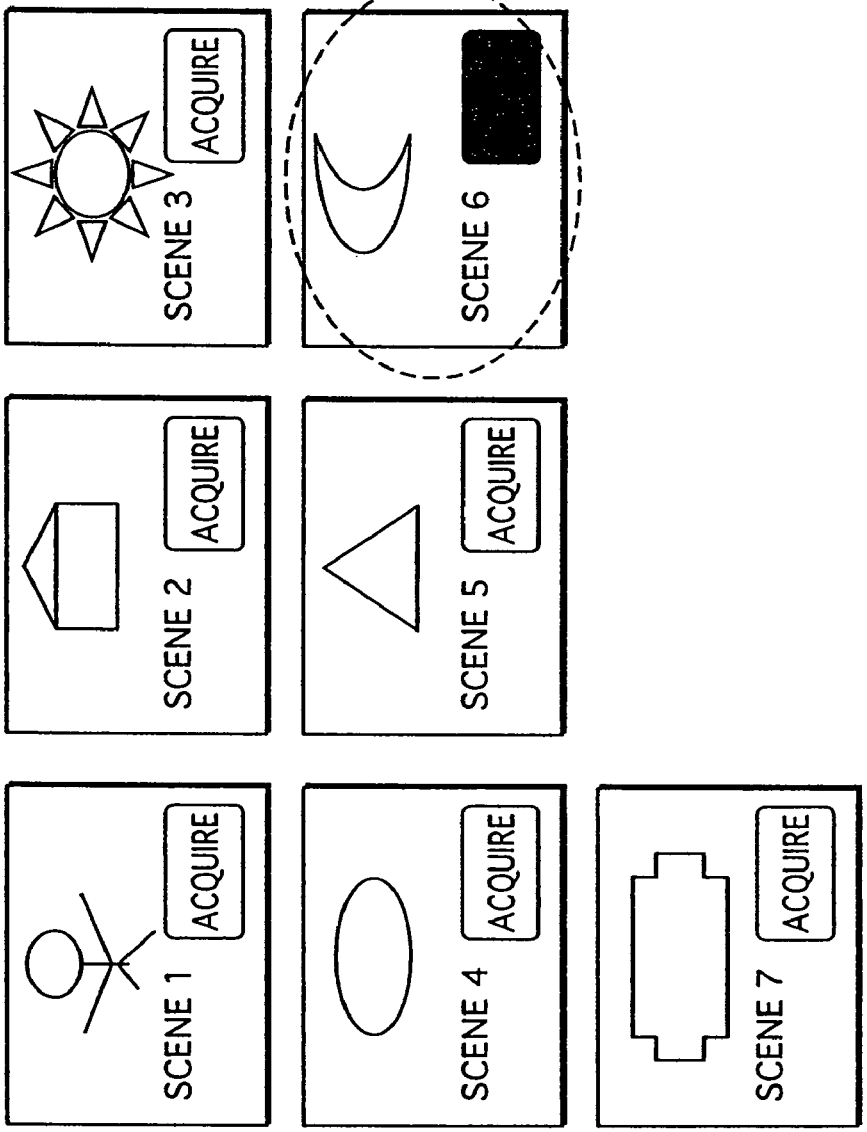
FIG. 14 is a view showing an example of playback according to a modification (2) of embodiment 1.

(2) The first playback apparatus 12 may be so constructed that the control unit 126 stores each piece of playback position information TI1 acquired in response to a request REQ received from the request input unit 125 rather than immediately outputting to the first transmission unit 127. For example, during playback of a movie content, a user inputs a request to the first playback apparatus at each scene of which related content the user may later request. After playback of the whole movie content, the user can view a list of scenes at which a request is made as shown in FIG. 14. Out of the scenes in the list, the user selects, with a touch of a corresponding button, a scene of which related content the user requests to acquire. In response, playback position information of the selected scene is transmitted to the sever, so that the requested related content is acquired. With this construction, a user is allowed to pre-select, as candidates for future selection, each and every scene of his interest during playback of a movie content, and selects scenes of which related contents the user actually wish to acquire. Further, this construction allows the user to concentrate on the movie content during playback, which increases user convenience.

(3) The request input unit 125 of the first playback apparatus 12 receives a request REQ from outside. Here, it is possible to include, in the request REQ, information specifying a position on a display screen that displays a scene of the first content CNT1 included in the content data CNTDATA, and to include the information specifying the display position in the playback position information TI1. With this arrangement, the user is allowed to inform the server 13, through the use of the first playback apparatus 12, not only a scene of which related content the user requests to acquire but also a particular display position, of the scene, of which related content the user requests to acquire. Accordingly, the content provider is allowed to efficiently provide related contents meeting even more detailed user requests. For example, during playback of a content, the user is allowed to specify a point on a scene being displayed (for example, a point corresponding to a building displayed at the upper right of the display screen) with a mouse, for example. By additionally including, in the playback position information TI1, the information specifying the display position, the user is allowed to acquire a content related to the specific display position on the specific scene of a content.

(4) Related contents that the server 13 transmits to the second playback apparatus 14 may be not only wall-paper data but also video data, description data, text data or bulletin board data relating to a scene of the first content CNT1 that is specified by the playback position information TI1. For example, when a user wishes to acquire information relating to a character or goods appearing in a scene of a movie content being played back by the first playback apparatus 12, the user can simply touch a button saying "Who is this?" or "What is this?" displayed on the screen of the first playback apparatus 12 during the scene. In response, the server 13 transmits, as a second content CNT2, a profile of the character or detailed information of the goods to the second playback apparatus 14.

(5) The server 13 receives a plurality of pieces of playback position information TI1 from the first playback apparatus 12. Here, the server 13 may be constructed so as to generate a new second content CNT2 by combining a plurality of second contents CNT2 each corresponding to one of the received pieces of playback position information, and transmits the thus generated new second content CNT2 to the second playback apparatus 14. For example, a user inputs a request to the first playback apparatus 12 at every scene in which his favorite performer appears. Every time when receiving such a request, the first playback apparatus 12 transmits a corresponding piece of playback position information TI1 to the server. With reference to the plurality of pieces of playback position information TI1, the server acquires a plurality of pieces of still image data to generate one piece of still image album data using the acquired still image data. The server then transmits the resulting still image album data as a second content CNT2 to the second playback apparatus 14. As a result, the user receives the second content CNT2 which is a combination of all the requested scenes. With this arrangement, a content provider is allowed to provide contents with even more flexibility.

(6) At the time of providing a second content CNT2, the server 13 may perform billing so that the user of the second playback apparatus 14 is charged for the second content CNT2. When performing billing, the user is identified with the user identifier UID, for example. Billing may be performed before or after the sever 13 transmits the second content CNT2. An amount to be billed may be determined in various manners. For example, an amount to be charged may differ depending on whether a content provided is a sample or a commercial product or whether the number of usage times. For example, when a second content CNT2 is a small-sized image serving as a sample of another content, the second content CNT2 may be provided to a user at no charge, while a second content CNT2, which is a product version of the image which is lager and better-quality, is provided at a charge. In another example, wall-paper data is provided to a user at no charge for the first time, and at a charge each time thereafter.

(7) The second playback apparatus 14 may be constructed so as to double as the first playback apparatus 12. In other words, the first playback apparatus 12 transmits, to the server 13, playback position information TI1 relating to a playback position, and the server 13 transmits a second content CNT2 back to the first playback apparatus 12.

(8) The first playback apparatus 12 may be constructed so that the control unit 126 acquires via the access unit 121, information specifying a current playback position of the first content CNT1. Further, the thus acquired information specifying the current playback position of the first content CNT1 may be included, instead of the counter CTR, in the counter playback position information TI1 that is transmitted from the first playback apparatus 12 to the server 13. For example, when content data CNTDATA is stored in an optical disc, a playback position is specified with a sector number, a track number, and an angle number in the case of multi-angle. These numbers may be used in combination with the counter CTR. With this arrangement, even if a first content CNT1 includes a branch, so that there is a plurality of possible scenarios one of which a user can select, the first playback apparatus 12 is allowed to accurately inform the server 13 of a current playback position of the first content CNT1 being played back by the current output unit 122. Further, the server 13 is allowed to be accurately informed of a current playback position of the first content CNT1 being played back by the current output unit 122 of the first playback apparatus 12 even if the first content CNT1 is a multi-angle content, which is composed of a plurality of video images.

(9) The first playback apparatus 12 may acquire content data CNTDATA not necessarily from the portable medium 10 but also via a network.

(10) The sever 13 may be constructed without the destination address storage unit 133, so that the destination address acquisition unit 132 may acquire a destination address ADR from an external source via a network. Further, the server 13 may be constructed without the content storage unit 135, so that the content acquisition unit 134 may acquire a second content CNT2 from an external source via a network.

(11) The first playback apparatus 12 may be provided with a fast-forward and fast-reverse function of the first content CNT1 according to playback control information provided externally. Even with this construction, the counter unit 123 may be constructed to hold a counter CTR that properly specifies a playback position of a first content CNT1 currently being played back by the first output unit 122.

(12) The first playback apparatus 12 may be constructed so that the control unit 126 is provided with a function of extracting, via the access unit 121, a part of a first content CNT1 that is currently played back by the current first output unit 122. Further, the first playback apparatus 12 may transmit to the server 13, a part of first content CNT1 being played back by the current first output unit 122. In other words, in response to a request REQ inputted from outside, the first playback apparatus 12 extracts, from the content data CONTDATA, a part of the first content CNT1 that is currently played back, and transmits to the server 13, playback position information TI1 that includes the extracted part. In response, the server 13 performs some kind of conversion on the received part of the first content CNT1 when required, and then generates a second content CNT2 from the part of the first content CNT1. The server 13 transmits the thus generated second content CNT2 to the second playback apparatus 14. For example, when a user touches a button displayed on the first playback apparatus 12 for acquisition of a related content, the first playback apparatus 12 fetches, from the content data CNTDATA, video data corresponding to a part of a first content CNT1 that is currently played back, and transmits the fetched video data to the server 13 without any processing performed thereon. Upon receipt of the video data, the server 13 performs conversion so as to generate wall-paper data using a part of the received video data, and then transmits the wall-paper data to the second playback apparatus 14. This arrangement eliminates the need for the content provider to provide the server 13 with second contents CNT2 in advance.

(13) The communications channel 11 via which the server 13 transmits a second content CNT2 to the second playback apparatus 14 may be a separate communications channel from the communications channel 11 via which the first playback apparatus 12 transmits playback position information TI1 to the server 13. For example, the first playback apparatus 12 transmits playback position information TI1 to the server 13 via a dedicated line, and the server 13 transmits a second content CNT2 to the second playback apparatus 14 via the Internet.

(14) A request REQ that the first playback apparatus 12 receives may include the degree of user's interest in the requested first content CNT1, and the first playback apparatus 12 transmits to the server 13, playback position information TI1 that includes the degree of user's interest. With this arrangement, the user is allowed to inform, with the use of the first playback apparatus 12, the server 13 of the degree of his interest in a first content CNT1 currently being played back. Based on the information on the degree of the user's interest, the content provider is allowed to provide related contents more suitably to the user's interest. For example, a user gives a score according to the degree of his interest in a movie content currently being played back, and transmits the score to the server 13 with the user of, for example, a keypad attached to the player. When receiving a high score, the server 13 transmits, as a second content, a title of a similar type movie for recommendation. On the other hand, when receiving a low score, the server 13 transmits, as a second content, a title of a different type movie for recommendation.

(15) The first playback apparatus 12 may be constructed so that user identifiers UID stored in the user information storage unit 124 may be inputted externally. For example, a user preliminarily goes through user registration on a registry server through, for example, a WEB service in order to acquire a user identifier UID. The user is then inputs the acquired user identifier UID to the first playback apparatus 12. In another example, a user-owned credit card number may be used as a user identifier UID.

(16) Prior to transmission from the server 13 to the second playback apparatus 14, a second content CNT2 may be processed in order to provide protection against unauthorized distribution. For example, a digital watermark may be embedded in a second content CNT2.

(17) The first playback apparatus 12 may be constructed without the first transmission unit 127, so that the control unit 126 outputs playback position information TI1 via the first output unit 122 to outside. The second playback apparatus 14 may be provided with an input unit for receiving an input of the playback position information TI1, and a transmission unit for transmitting the playback position information TI1. To request a related content, a user inputs playback position information TI1 that has been outputted from the first playback apparatus 12 via the first output unit 122 to the input unit of the second playback apparatus 14, so that the playback position information TI1 is transmitted from the second playback apparatus 14 to the server 13. With this construction, even when the first playback apparatus 12 is not connected to the communications channel 11, a related content that relates to the first content CNT1 being played back by the first playback apparatus 12 is acquired. Here, the playback position information TI1 outputted from the first playback apparatus 12 may be a G-code, which is a series of numbers used for recording TV programs, or a QR code, which is a new-generation bar code. Further, it may be applicable that playback position information TI1 printed, for example, on a magazine is inputted to the second playback apparatus 14 via the input unit, and transmitted from the second playback apparatus 14 to the server 13 in a manner similar to the above. Note that the playback position information TI1 that has been outputted from the first playback apparatus 12 may be inputted to a separate apparatus from the second playback apparatus 14.

(18) There may be provided a function to cancel a request REQ for a related content any time between receipt of by the request input unit 125 and transmission by the first playback apparatus 12 to the server 13. Further, there may be provided a function to cancel a request REQ any time between receipt of the request REQ by the first playback apparatus 12 and transmission of a requested second content CNT2 by the server 13 to the second playback apparatus 14.

(19) The playback position information TI1 transmitted from the first playback apparatus 12 to the server 13 may include, instead of a user identifier UID, a destination address ADR specifying a second playback apparatus 14 being the destination.

(20) Content identifiers CID used by the first playback apparatus 12 and the server 13 may be disc identifiers unique to each disc. Each disc identifier uniquely identifies a disc.

(21) The present invention may be embodied as a method described above, or a computer program performing the method with a computer. Further, the present invention may be digital signals representing the computer program.

Still further, the present invention may be embodied as a computer-readable recording medium storing the computer program or the digital signals. Examples of such a recording medium include a semiconductor memory, a hard disk drive, a CD-ROM, a DVD-ROM, a DVD-RAM.

(22) The present invention may be embodied as any combination of the above embodiments and modifications.

Embodiment 2

Now, description is given to a contents linkage information delivery system 2 as an embodiment 2 of the present invention. In the contents linkage information delivery system 1 according to embodiment 1, playback position information is transmitted from the playback apparatus to the server. The contents linkage information delivery system 2 according to embodiment 2 greatly differs from that of embodiment 1 in that playback position information is transmitted from the server to the playback apparatus.

Figure 15:
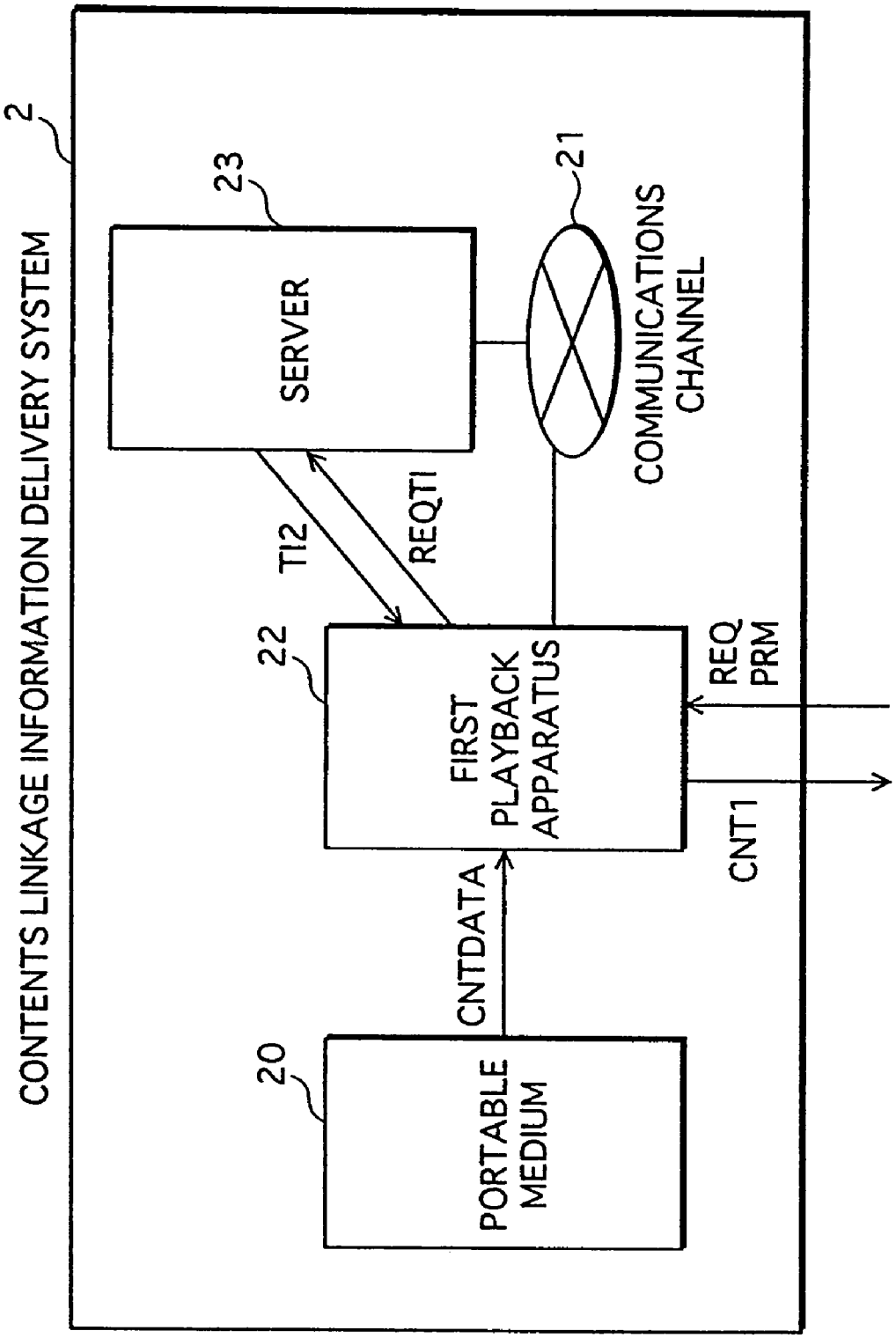
FIG. 15 is a view showing an overview of a contents linkage information delivery system 2 of embodiment 2 according to the present invention.

First, with reference to FIG. 15, an overview of embodiment 2 is given and then a concrete example is described briefly.

In the figure, a reference numeral 20 denotes a portable medium. Similarly to the portable medium 10, the portable medium 20 is a recording medium such as a CD-ROM or a DVD-ROM having content data CNTDATA recorded thereon. The content data CNTDATA includes a first content CNT1, such as a video content or an audio content, in a format compliant with a later described playback apparatus 22. Reference numeral 21 denotes a communications channel, which is a network such as the Internet which is similar to the communications channel 11. Reference numeral 22 is the playback apparatus which is an apparatus that reads and plays back the first content CNT1 included in the content data CNTDATA recorded on the portable medium 20. When receiving from an externally inputted user request REQ requesting playback position information TI2, the playback apparatus 22 transmits a playback position information request REQTI to a server 23 via the communications channel 21. When receiving from the server 23, playback position information TI2 regarding a playback position of a content, and receiving from outside, permission PRM indicating that the user has agreed to change a current playback position of the content, the playback apparatus 22 changes the current playback position of the first content CNT1 based on the received playback position information TI2. The playback apparatus 22 then starts or re-starts playback of the first content CNT1 from the newly set playback position. Reference numeral 23 denotes the server which transmits, in response to a playback position information request REQTI, playback position information TI2 to the playback apparatus 22 via the communications channel 21.

The contents linkage information delivery system 2 is applicable to where a content provider has delivered content data CNTDATA to a user by way of a recording medium such as a CD-ROM and a DVD-ROM. Based on an externally inputted request REQ, the user transmits a playback position information request REQTI to the server 23. In response to the playback position information request REQTI, the server 23 transmits playback position information TI2 back to the playback apparatus 22. Based on the received playback position information TI2 and permission PRM, the playback apparatus 22 changes the playback position of the first content CNT1 included in the content data CNTDATA. As above, according to the contents linkage information delivery system 2, a content provider transmits playback position information of a content to a user's playback apparatus, so that recommended scenes of content are flexibly provided.

Next, a concrete example employing the present embodiment is briefly described. A user owns a DVD player (playback apparatus 22). The DVD player is connected to the Internet (communications channel 21) and thus can browse an Internet bulletin board offered by a bulletin board server (server 23) The user mounts a DVD (portable medium 20) on the DVD player and depresses a button provided on the DVD player for bulletin board acquisition (acquisition request REQ). In response, the DVD player transmits information of the DVD being mounted thereon to the bulletin board server, and then receives bulletin board data that includes playback position information (playback position information TI2) of the DVD. With reference to messages on the bulletin board, the user depresses a button provided on the DVD player to give permission to change the playback position (permission PRM). In response, the DVD player changes the playback position based on the playback position information included in the bulletin board data, so that playback of the content starts from the scene corresponding to the specified playback time. In this manner, the user can play pack the scenes recommended by messages in the bulletin board.

This concludes the brief description of the present embodiment. Now, description is given in detail to the contents linkage information delivery system 2 which is one embodiment of the present invention.

<Construction of Contents Linkage Information Delivery System 2>

As shown in FIG. 15, the contents linkage information delivery system 2 is composed of the portable medium 20, the communications channel 21, the playback apparatus 22, and the server 23.

The playback apparatus 22 plays back a first content CNT1 that is included in the content data CNTDATA recorded on the portable medium 20. Further, in response to an external request REQ, the playback apparatus 22 transmits a playback position information request REQTI to the server 23. When receiving playback position information TI2 from the server 23 and permission PRM from outside, the playback apparatus 22 changes the playback position of the first content CNT1 included in the content data CNTDATA based on the received playback position information TI2, and plays back the first content CNT1 starting from the newly set playback position. When receiving the playback position information request REQTI from the playback apparatus 22, the server 23 transmits playback position information TI2 back to the playback apparatus 22.

Hereinafter, description is given in detail to the above components. However, description of the portable medium 20 and the communications channel 21 is omitted herein because they are similar in construction to the portable medium 10 and the communications channel 11, respectively, of the contents linkage information delivery system 1. Now, description is given to the construction and operation of both the playback apparatus 22 and the server 23.

<Construction of Playback Apparatus 22>

Figure 16:
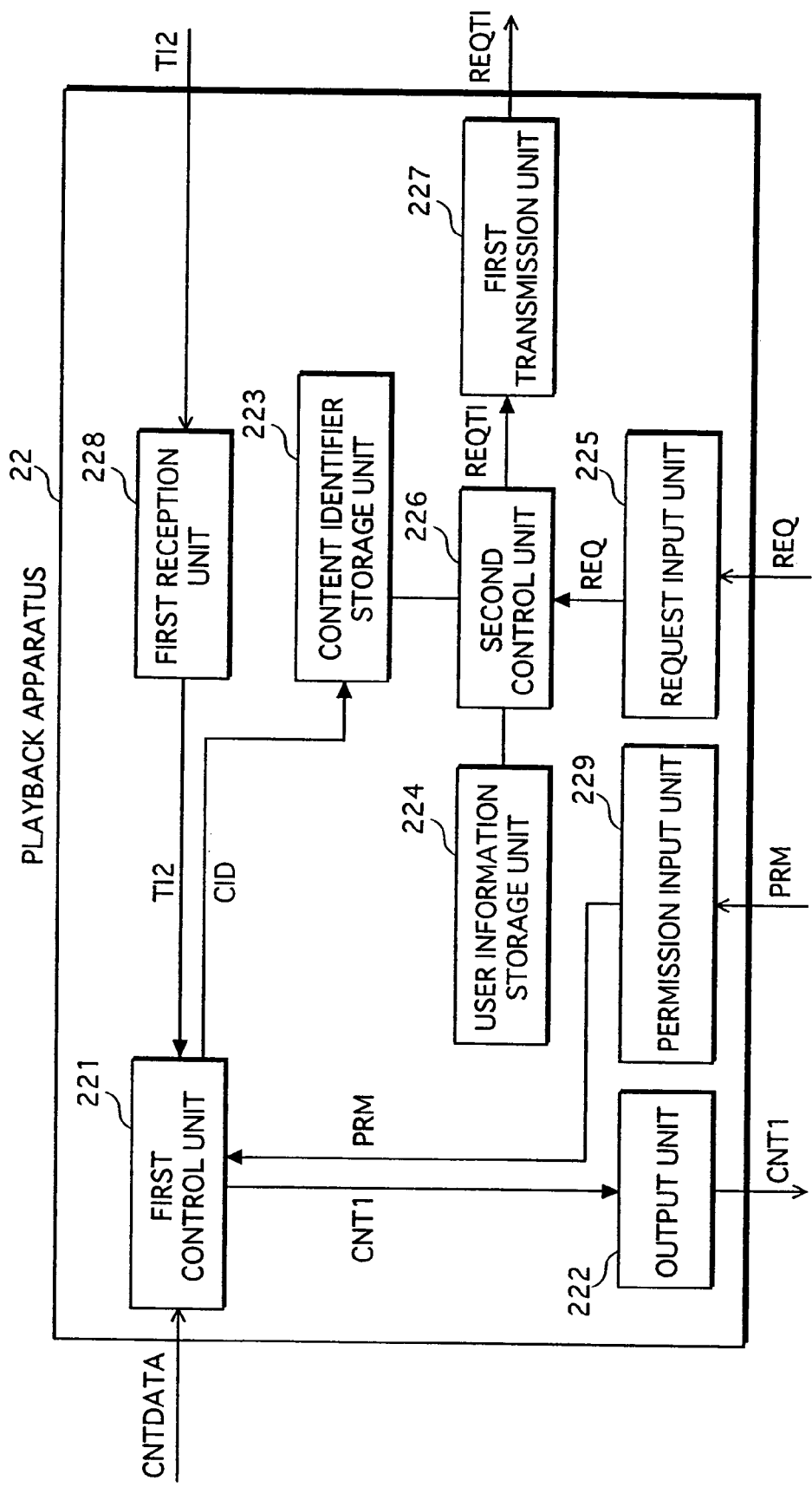
FIG. 16 is a view showing an exemplary construction of a playback apparatus 22 of embodiment 2.

As shown in FIG. 16, the playback apparatus 22 is composed of a first control unit 221, an output unit 222, a content identifier storage unit 223, a user information storage unit 224, a request input unit 225, a second control unit 226, a first transmission unit 227, a first reception unit 228, and a permission input unit 229. Here, the output unit 222, the user information storage unit 224, and the request input unit 225 are similar to corresponding components of the first playback apparatus 12 included in the contents linkage information delivery system 1 according to embodiment 1, namely the first output unit 122, the user information storage unit 124, and the request input unit 125. Thus, description hereinafter is given to the first control unit 221, the content identifier storage unit 223, the second control unit 226, the first transmission unit 227, the first reception unit 228, and the permission input unit 229.

(1) First Control Unit 221

To start playback of the first content CNT1 recorded on the portable medium 20, the first control unit 221 reads content data CNTDATA recorded on the portable medium 20 to extract a content identifier CID, and outputs the extracted content identifier CID to the content identifier storage unit 223. Thereafter, the first control unit 221 keeps reading the content data CNTDATA recorded on the portable medium 20 to sequentially output the first content CNT1 part by part to the output unit 222. Further, when receiving playback position information TI2 from the first reception unit 228 and permission PRM from the permission input unit 229, the first control unit 221 changes the extraction position of the first content according to a counter CTR included in the received playback position information TI2. The first control unit 221 then sequentially extracts the first content CNT1 part by part starting from the newly set playback position, and outputs the extracted part of the first content CNT1 to the output unit 222.

(2) Content Identifier Storage Unit 223

Figure 17:
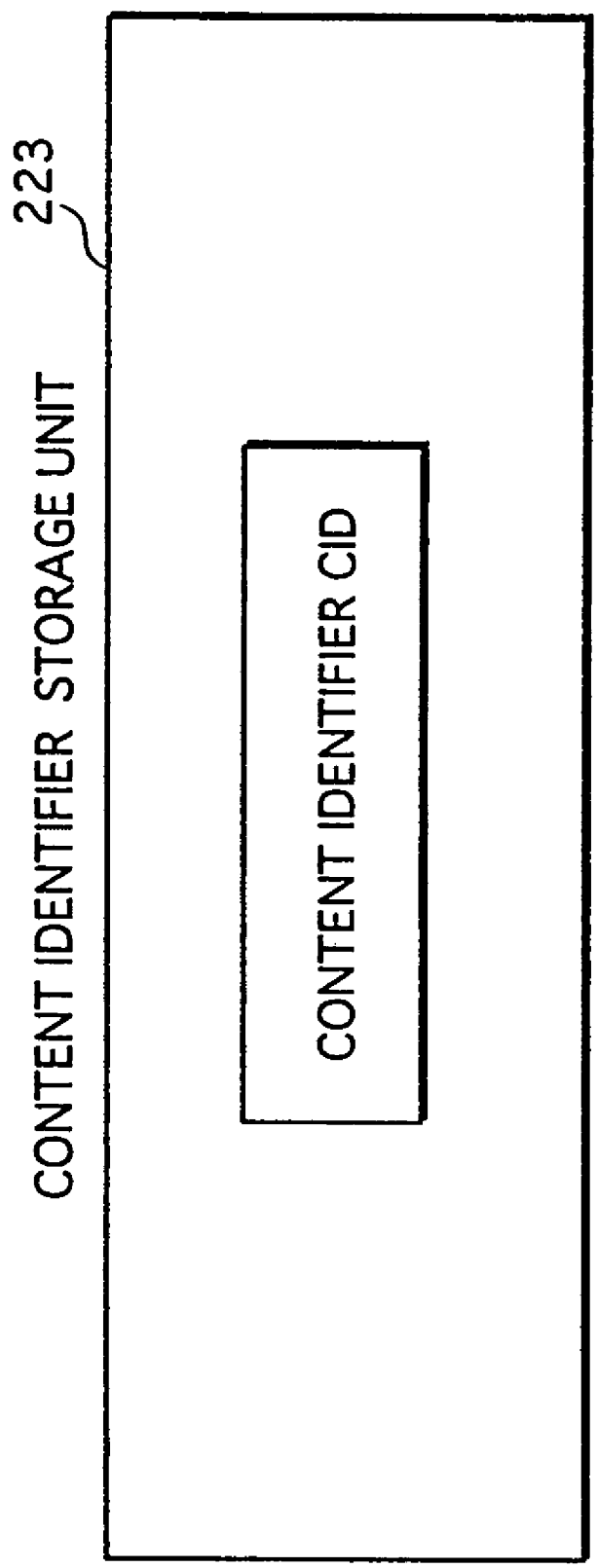
FIG. 17 is a view showing an exemplary construction of a content identifier storage unit 223 of embodiment 2.

As shown in FIG. 17, the content identifier storage unit 223 stores a content identifier CID, and when receiving another content identifier CID from the first control unit 221, additionally stores the received content identifier CID. Each content identifier CID uniquely identifies a first content CNT1 included in content data CNTDATA.

(3) Second Control Unit 226

Figure 18:
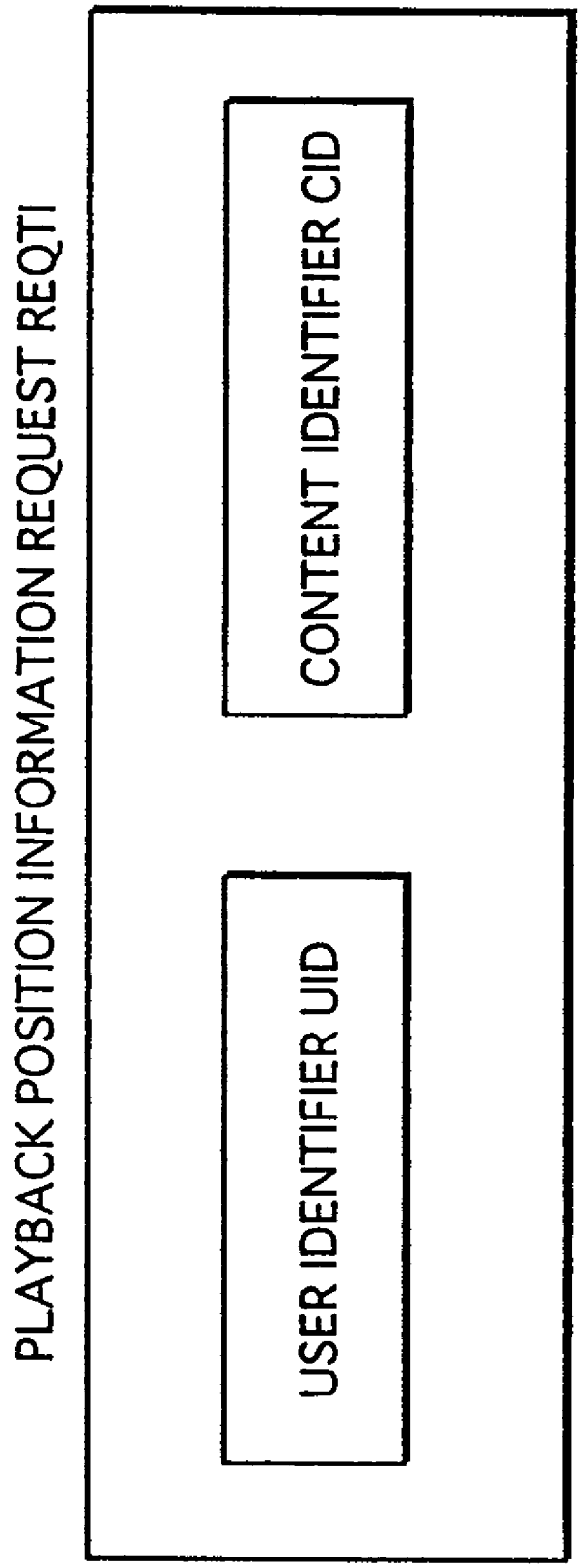
FIG. 18 is a view showing an example of playback position information request REQTI of embodiment 2.

Upon receipt of a request REQ from the request input unit 225, the second control unit 226 acquires a content identifier CID and a user identifier UID from the content identifier storage unit 223 and the user information storage unit 224, respectively. The second control unit 226 generates playback position information request REQTI that is composed of the user identifier UID and the content identifier CID, as shown in FIG. 18, and then outputs the thus generated playback position information request REQTI to the first transmission unit 227.

(4) First Transmission Unit 227

The first transmission unit 227 transmits, to the server 23 via the communications channel 21, a playback position information request REQTI that is received from the second control unit 226.

(5) First Reception Unit 228

Figure 19:
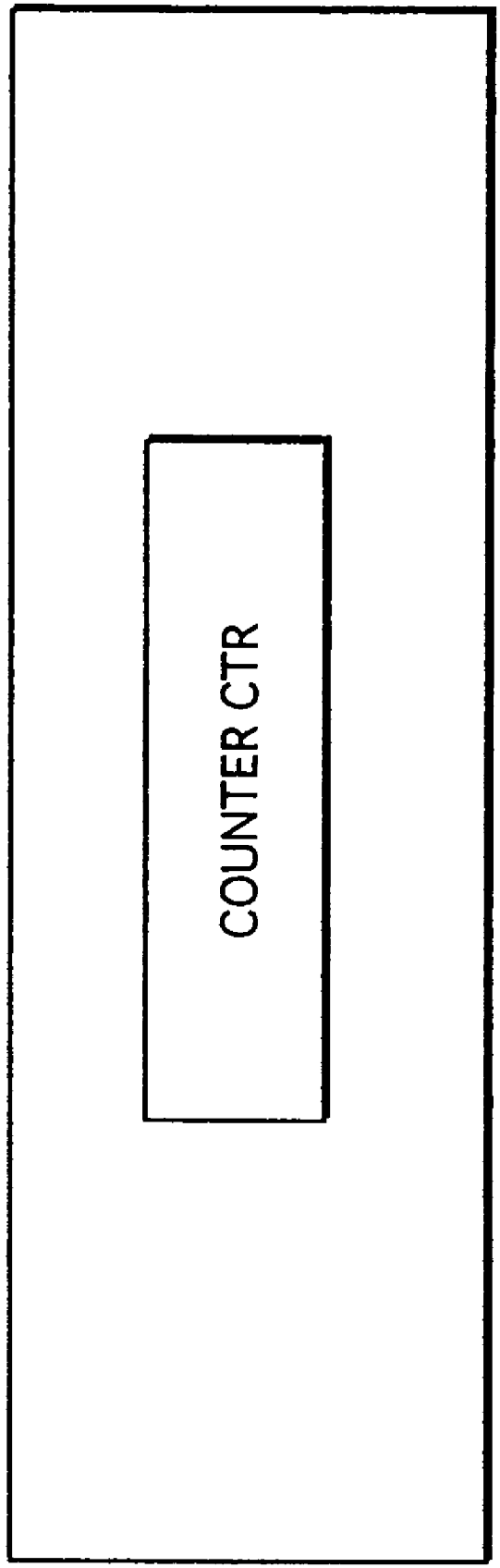
FIG. 19 is a view showing an example of playback position information TI2 of embodiment 2.

When receiving playback position information TI2 from the server 23 via the communications channel 21, the first reception unit 228 transmits the received playback position information TI2 to the first control unit 221. As shown in FIG. 19, the playback position information TI2 is composed of a content identifier CID and a counter CTR.

(6) Permission Input Unit 229

The permission input unit 229 receives an external input of permission PRM. To be more specific, the permission input unit 229 is provided with, for example, a button, a keypad, a computer keyboard, or a mouse. Permission PRM is a signal indicative of whether to permit the playback position of the first content CNT1 to be changed according to playback position information TI2 received by the playback apparatus 22. Permission PRM is issued in response, for example, to a push of a button. When receiving an external input of permission PRM, the permission input unit 229 judges that the user permits to change the playback position of the first content CNT1, and outputs the received permission PRM to the first control unit 221.

<Operations of Playback Apparatus 22>

Figure 20:
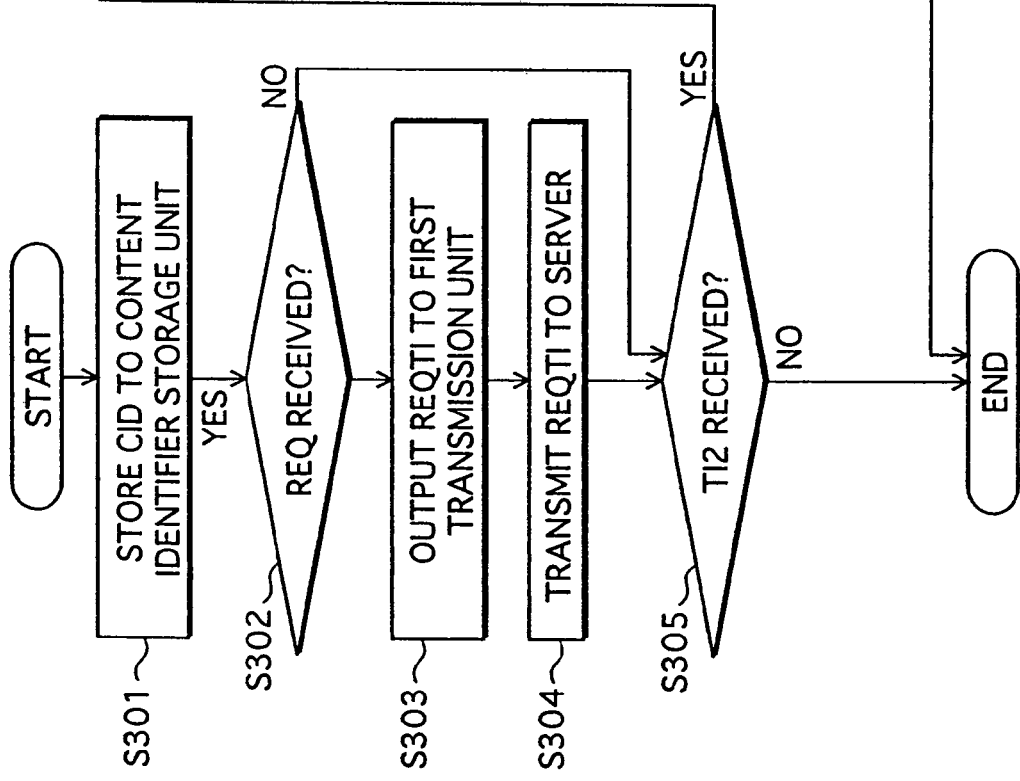
FIG. 20 is a flowchart of operations performed by the playback apparatus 22 of embodiment 2.

Up to this point, description has been given to the construction of the playback apparatus 22. Hereinafter, description is given to the operations of the playback apparatus 22 with reference to the flowchart shown in FIG. 20.

First, to start playback of a first content CNT1 recorded on the portable medium 20, the first control unit 221 extracts a content identifier CID from the content data CNTDATA, and outputs the extracted content identifier CID to the content identifier storage unit 223. In response, the content identifier storage unit 223 stores therein the received content identifier CID (step S301).

Next, when receiving an external input of a request REQ, the request input unit 225 outputs the received request REQ to the second control unit 226. The processing then goes onto a step S303 described below. In the case where the request input unit 225 has received no request REQ, the processing goes onto a step S305 described below (step S302).

Next, the second control unit 226 extracts the content identifier CID from the content identifier storage unit 223, and the user identifier UID from the user identifier storage unit 224. The second control unit 226 then generates, from the extracted content identifier CID and user identifier UID, a playback position information request REQTI that is composed of the content identifier CID and the user identifier UID, and then outputs the generated playback position information request REQTI to the first transmission unit 227 (step S303).

In response, the first transmission unit 227 transmits the received playback position information request REQTI to the server 23 (step S304).

Next, when receiving the playback position information TI2, the first reception unit 228 outputs the received playback position information TI2 to the first control unit 221, and then the processing goes onto a step S306. In the case where the first reception unit 228 has received no playback position information TI2, the processing is terminated (step S305).

Next, when receiving an external input of permission PRM, the permission input unit 229 outputs the received permission PRM to the first control unit, and then the processing goes onto a step S307 described below. On the other hand, when the permission input unit 229 has received no external input of permission PRM, the processing is terminated (step S306).

According to the counter CTR included in the received playback position information TI2, the first control unit sets to change the extraction position of the first content CNT1 included in the content data CNTDATA recorded on the portable medium 20, so that extraction of the first content is started from the newly set playback position (step S307).

The first control unit 221 sequentially extracts the first content CNT1 part by part from the content data CNTDATA recorded on the portable medium 20, and outputs the extracted part to the output unit 222 (step S308).

Next, the output unit 222 sequentially plays back the first content CNT1 received from the first content CNT1 (step S309).

The first control unit 221 terminates the processing at the time when the output unit 222 completes the output of the entire first content CNT1 included in the content data CNTDATA. On the other hand, when the first content CNT1 has not yet been played back completely, the processing goes back to the step S308 (step S313).

This completes the construction and processing of the playback apparatus 22, which is one component of the contents linkage information delivery system 2. Now, description is given to the constructions and operations of the server 23.

<Construction of Server 23>

Figure 21:
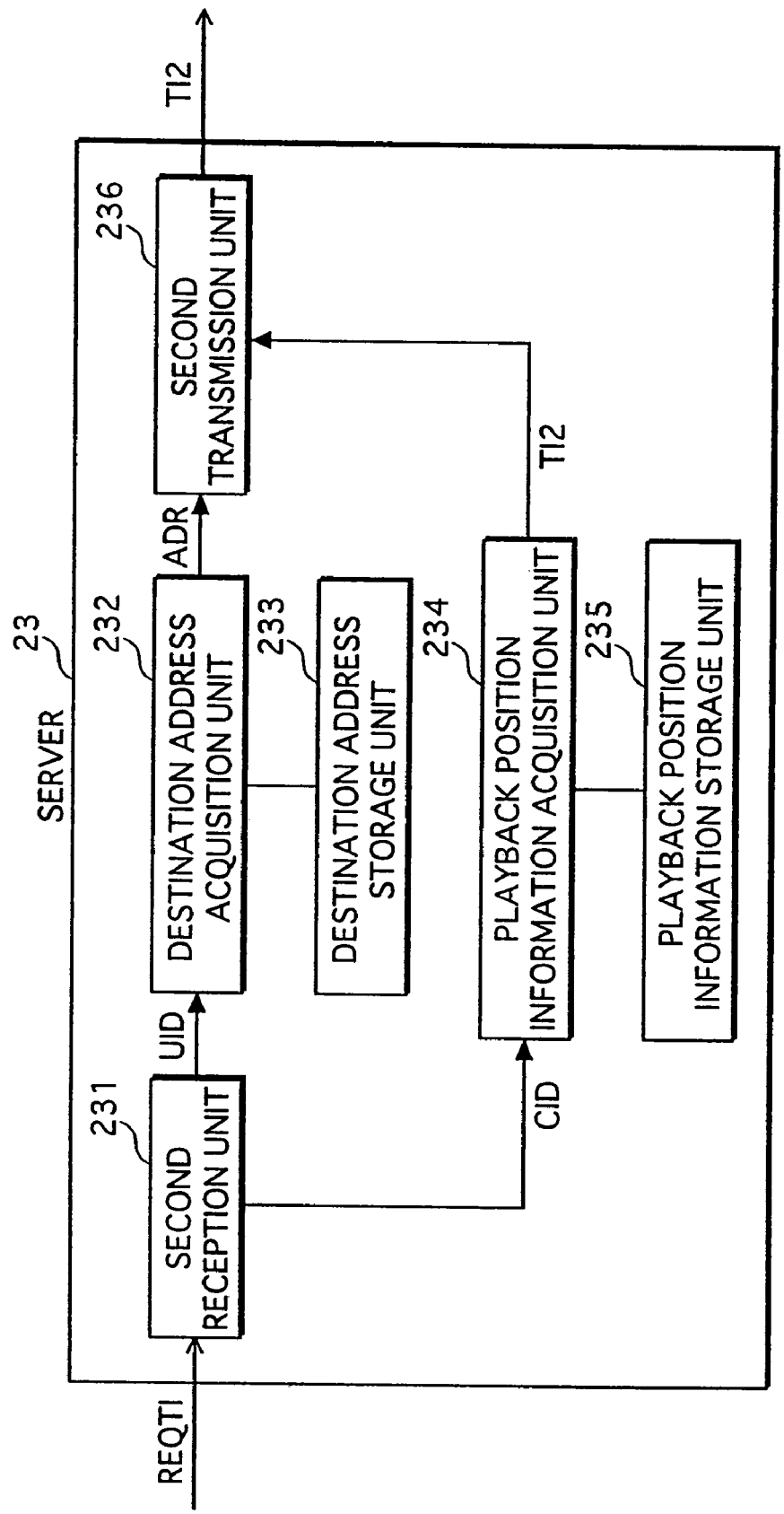
FIG. 21 is a view showing an exemplary construction of a server 23 of embodiment 2.

As shown in FIG. 21, the server 23 is composed of a second reception unit 231, a destination address acquisition unit 232, a destination address storage unit 233, a playback position information acquisition unit 234, a playback position information storage unit 235, and a second transmission unit 236. Here, the destination address acquisition unit 232 and the destination address storage unit 233 are similar to corresponding components of the server 13 included in the contents linkage information delivery system 1 according to embodiment 1, namely the destination address acquisition unit 132 and the destination address storage unit 133. Thus, description hereinafter is given to the second reception unit 231, the playback position information acquisition unit 234, the playback position information storage unit 235, and the second transmission unit 236.

(1) Second Reception Unit 231

The second reception unit 231 receives playback position information TI2 from the first playback apparatus 22 via the communications channel 21. Upon receipt, the second reception unit 231 extracts a user identifier UID and a content identifier CID from the received playback position information TI2, and outputs the extracted user identifier UID and content identifier CID to the destination address acquisition unit 232 and the playback position information acquisition unit 234, respectively.

(2) Playback Position Information Acquisition Unit 234

Figure 22:
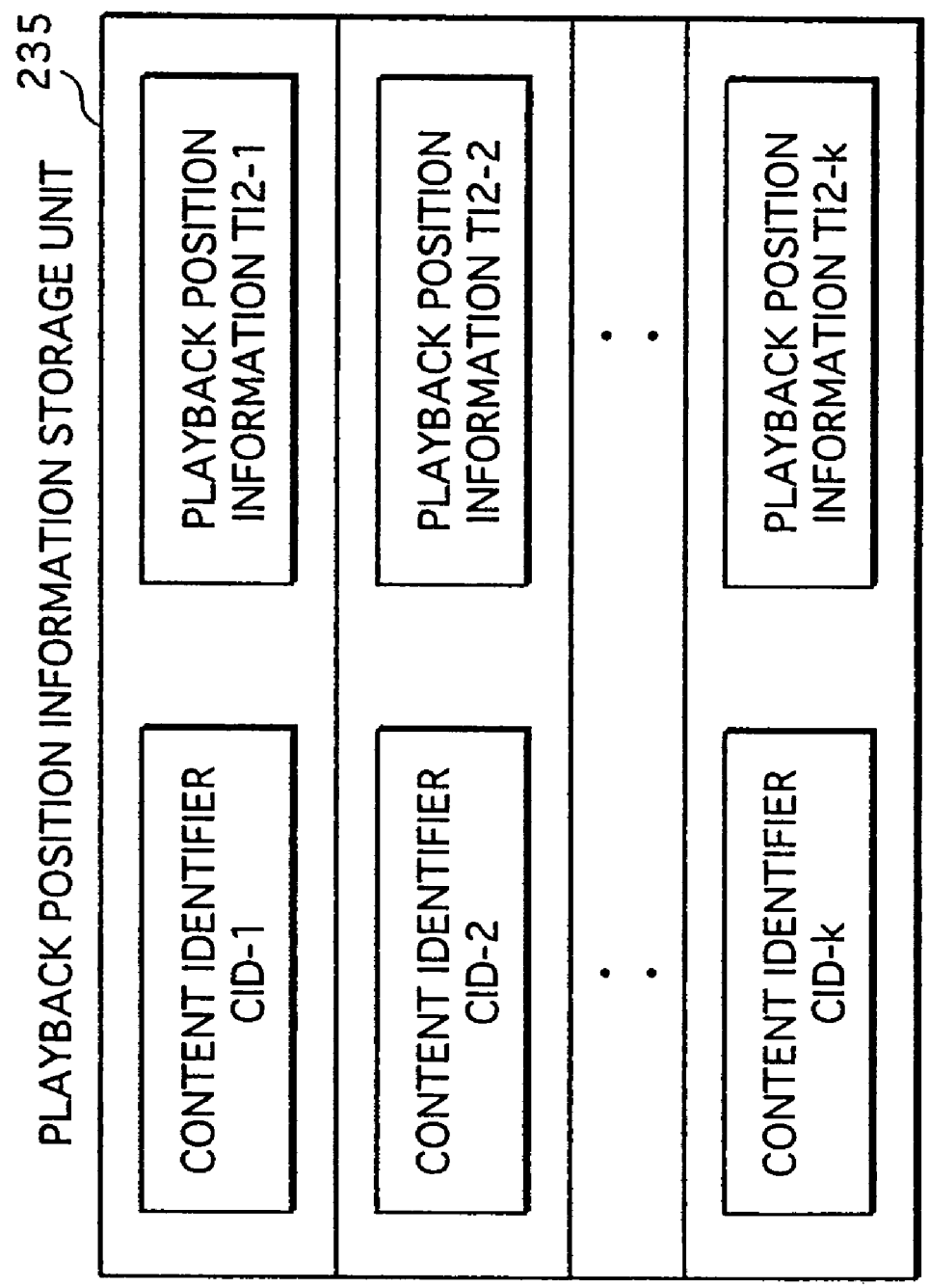
FIG. 22 is a view showing an exemplary construction of a playback position information storage unit 235 of embodiment 2.

The playback position information acquisition unit 234 receives a content identifier CID from the second reception unit 231. Upon receipt, the playback position information acquisition unit 234 makes an access to the playback position information storage unit 235, which is shown in FIG. 22, to acquire playback position information TI2 that corresponds to the received content identifier CID. The playback position information acquisition unit 234 then outputs the acquired playback position information TI2 to the second transmission unit 236.

(3) Playback Position Information Storage Unit 235

As shown in FIG. 22, the playback position information storage unit 235, for example, stores pieces of playback position information TI2 in a one-to-one correspondence with content identifiers CID. The playback position information storage unit 235 shown in FIG. 22 stores the playback position information TI2-1 that corresponds to the content identifier CID-1, the playback position information TI2-2 that corresponds to the content identifier CID-2, and the playback position information TI2-k that corresponds to the content identifier CID-k. The content identifiers CID and corresponding pieces of playback position information TI2 are registered in advance by the content provider.

(4) Second Transmission Unit 236

The second transmission unit 236 acquires a destination address ADR and playback position information TI2 from the destination address acquisition unit 232 and the playback position information acquisition unit 234, respectively. With reference to the received destination address ADR, the second transmission unit 236 uniquely identifies the playback apparatus 22 being the transmission destination, and transmits the received playback position information TI2 to the identified playback apparatus 22.

<Operations of Server 23>

Figure 23:
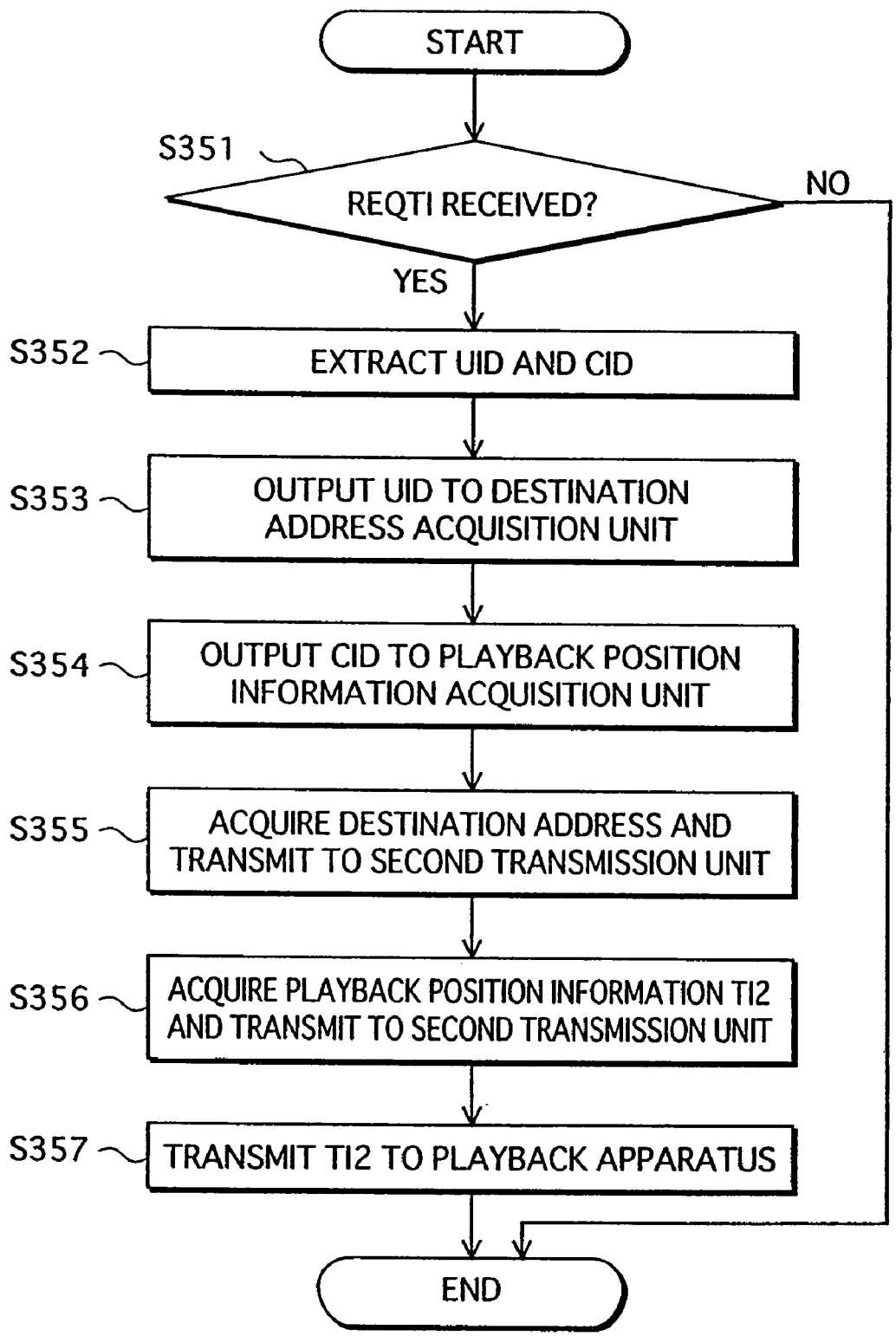
FIG. 23 is a flowchart of operations performed by the server 23 of embodiment 2.

Up to this point, description has been given to the construction of the server 23. Now, description is given to the operations of the server 23 with reference to the flowchart shown in FIG. 23.

First, in the case where the second reception unit 231 has received no playback position information request REQTI from the playback apparatus 22 via the communications channel 21, the processing is terminated. On the other hand, when the second reception unit 231 has received a playback position information request REQTI from the playback apparatus 22 via the communications channel 21, the processing goes onto a step S352 described below (step S351).

The second reception unit 231 extracts a user identifier UID and a content identifier CID from the received playback position information request REQTI (step S352).

The second reception unit 231 outputs the extracted user identifier UID to the destination address acquisition unit 232 (step S353).

Further, the second reception unit 231 outputs the extracted content identifier CID to the playback position information acquisition unit 234 (step S354).

Next, the destination address acquisition unit 232 accesses the destination address storage unit 233 to acquire, with reference to the received user identifier UID, a destination address ADR of the playback apparatus 22 that corresponds to the received user identifier UID. The destination address acquisition unit 232 then outputs the acquired destination address ADR to the second transmission unit 236 (step S355).

Next, the playback position information acquisition unit 234 makes an access to the playback position information storage unit 235 to acquire, with reference to the content identifier CID received from the second reception unit 231, playback position information TI2 that corresponds to the received content identifier CID. The playback position information acquisition unit 234 then outputs the acquired playback position information TI2 to the second reception unit 236 (step S356).

Next, the second transmission unit 236 receives the destination address ADR and the playback position information TI2 from the destination address acquisition unit 232 and the playback position information acquisition unit 234, respectively. Based on the received destination address ADR, the second transmission unit 236 uniquely identifies the playback apparatus 22 being the transmission destination of the received playback position information TI2, and transmits the playback position information TI2 to the thus identified playback apparatus 22 (step S357).

This concludes the description of the construction and operations of the server 23, which is a component of the contents linkage information delivery system 2.

<Effect of Contents Linkage Information Delivery System 2>

Up to this point, description has been given to the embodiment of the contents linkage information delivery system 2. The contents linkage information delivery system 2 is so constructed that the playback apparatus 22 transmits, in response to an external input of a request REQ, a playback position information request REQTI to the server 23. In response, the server 23 transmits playback position information TI2 back to the playback apparatus 22. The playback position information TI2 specifies a playback position of a first content CNT1 included in content data CNTDATA. The playback apparatus 23 changes the playback position of the content according to the playback position information TI2 received from the server 23 and permission PRM received externally. With this construction, the user is allowed to playback a specific part of the first content CNT1 as specified by the serve 23 with no extra operations. In other words, the contents linkage information delivery system 2 allows the content provider to specify a playback position of a first content CNT1 with ease.

<Modifications>

The embodiment described above is one example of the present invention, and the present invention is in no way limited to this specific embodiment. It is apparent that various changes and modifications may be made without departing from the gist of the present invention. The following modifications are also considered to fall within the scope of the present invention.

Figure 24:
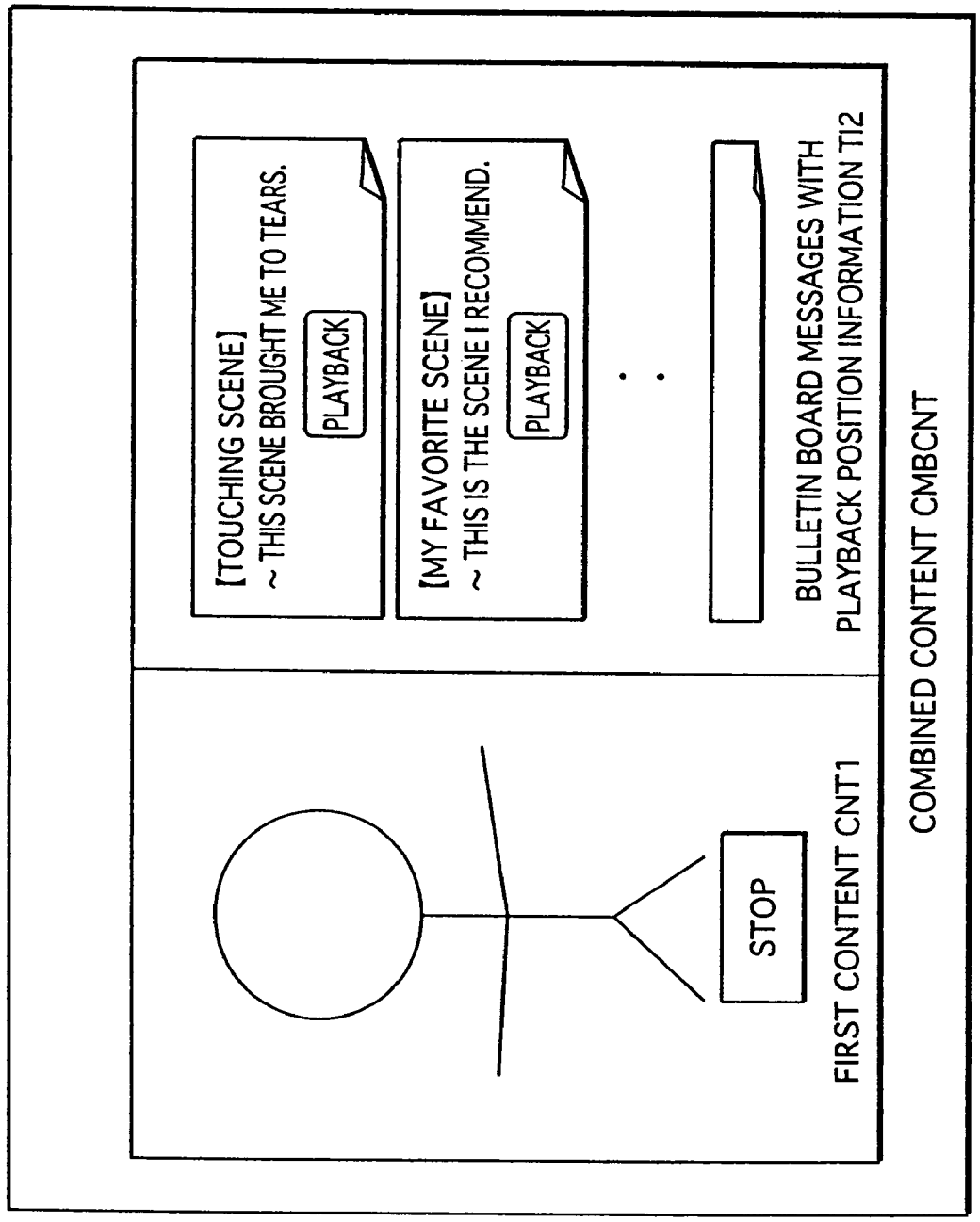
FIG. 24 is a view showing an example of playback according to a modification (1) of embodiment 2.

(1) Instead of playback position information TI2, the server 23 may transmit to the playback apparatus 22 a third content that includes playback position information TI2. The first control unit 221 of the playback apparatus 22 may generate a combined content using the first content CNT1 that is included in the content data CNTDATA and a remaining part of the third content aside from the playback position information TI2, and then output the resulting combined content to the output unit 222. The output unit 222 may play back the received combined content. In short, the server 23 may transmit to the playback apparatus 22, a bulletin board content that includes playback position information TI2. In response, the playback apparatus 22 reads the bulletin board content. Consequently, the playback apparatus 22 may display, as shown in FIG. 24, the first content CNT1 on the left half of the display screen and the bulletin board content on the right half of the display screen. With this arrangement, the user can refer to the bulletin board content while viewing the first content CNT1. When the user selects the playback position information TI2 mentioned in the bulletin board content, the playback position of the first content CNT1 is changed based on the playback position information TI2, so that the first content CNT1 on the left of the display screen and the bulletin board on the right are associatively played back. In the example shown in FIG. 25, when the user selects a "playback" button provided on the display screen for a message on the displayed bulletin board, the playback position of the first content CNT1 is changed to the playback position specified by the playback position information TI2 that corresponds to the selected message. As a result, the selected part of the first content CNT1 is played back on the left half of the display screen.

(2) The playback apparatus 22 may be so constructed that the second control unit 226 transmits a playback position information request REQTI to the server 23 regardless of whether the request input unit 225 has received an external input of a request REQ. For example, while playing back a movie, the player transmits a playback position information request REQTI, to a server continuously or periodically. With this construction, the playback apparatus 22 may acquire playback position information TI2 without requiring the user to input a request REQ to the playback apparatus 22. Further, in combination with the modification (1) of embodiment 2, the playback apparatus 22 is allowed to sequentially play back the first content CNT1 associatively with a related content. In the example shown in FIG. 26, the player plays back a movie content onto the left half of the display screen. Concurrently, the player sequentially transmits a current playback position of the movie content to the server. In response, the player receives a bulletin board content related to the part of the movie content that is currently played back, so that the received bulletin board content is associatively displayed on the right half of the display screen. Note that it may be applicable to solely play back the first content CNT1 without displaying the bulletin board data. In this case, the user inputs a request REQ for a related content during the playback of the first content CNT1, and the play back apparatus 22 displays a list of requested related contents as shown in FIG. 27 after completing the playback of the first content CNT1. The user then selects to display any of the related contents.

(3) It is applicable to include a content identifier CID in playback position information TI2. Here, the playback apparatus 22 may be constructed so as to output the received playback position information TI2 to the first control unit 221 only when the content identifier CID included in the received playback position information TI2 matches a content identifier CID stored in the content identifier storage unit 223. With this arrangement, the server 23 transmits playback position information T2 to an indefinite number of destinations. Here, the playback apparatus 22 selectively uses playback position information TI2 that includes a content identifier CID matching a content identifier CID that is included in the currently set content data CNTDATA.

(4) It is applicable that the server 23 transmits playback position information TI2 that includes information specifying, in terms of a position on a display screen, a section of a scene of a first content CNT1 included in the content data CNTDATA currently being played back. With this arrangement, the user is informed of, from the server 23 through the use of the playback apparatus 22, not only recommended scenes of the first content CNT1 but also which particular section of the scenes on the display screen are recommended. In other words, a content provider is allowed to present users detailed information on scenes recommended. For example, the playback apparatus 22 may be constructed to display marks such as a square or a circle so as to point out a specific section (for example, a building displayed on the top right) of a scene displayed on the display screen. In this way, the content provider is allowed to present recommended scenes in detail to users.

(5) The server 23 may charge a user of the playback apparatus 22 upon providing playback position information TI2 to the playback apparatus 22. Here, the user is specified with the user of, for example, a user identifier UID. Note that billing processing may be performed before or after the transmission of playback position information TI2 from the server 23. The amount to be charged may be determined in various manners, and may differ depending on the number of times the playback position information has been provided. For example, playback position information may be provided at no charge for the first time and on a chargeable basis each time thereafter.

(6) The server 23 transmits to the playback apparatus 22, playback position information TI2 after processing to prevent unauthorized distribution of contents. To this end, for example, the playback position information TI2 may be encrypted.

(7) The playback apparatus 22 may be constructed to change, upon receipt of playback position information, the extraction position of the first content CNT1 according to the value of the counter CTR included in the received playback position information TI2 even when the permission input unit 229 has received no external input of permission PRM and thus the first control unit 221 has received no permission PRM. For example, the playback apparatus 22 may be constructed to change the playback position upon receipt of playback position information TI2 without prompting the user with a message "Playback position to be changed?".

(8) The server 23 may be constructed to transmit, to the playback apparatus 22, playback position information TI2 that includes control information used to control playback operation of the first content CNT1. When the playback apparatus 22 starts to play back a position of the first content CNT1 corresponding to the counter CTR specified by the playback position information TI2, the playback operation is performed according to the control information. For example, when the playback apparatus 22 starts to play back a specified position of the first content CNT1, a comment may be superposed on the display screen or the playback may be switched to another scene.

(9) Specifically speaking, each apparatus described above is a computer system that is basically composed of a microprocessor, ROM, RAM, a hard disk unit, a display unit, a keyboard, and a mouse. The RAM or the hard disk unit stores therein a computer program. Each apparatus performs its function by the microprocessor operating according to the computer program.

(10) The present invention may be embodied as a method implementing the steps described above, or as a computer program for use by a computer to implement such a method. Further, the present invention may be implemented as digital signals representing such a computer program.

Still further, the present invention may be embodied as a computer-readable medium storing the computer program or digital signals mentioned above. Examples of such a computer-readable medium include a semiconductor memory, a hard disk drive, CD-ROM, DVD-ROM, and DVD-RAM.

(11) Still further, the present invention may be embodied as any combination of the above preferred embodiments and modifications.

EFFECT OF PRESENT INVENTION

As described above, the present invention is made in view of problems inherent to the conventional systems. The present invention provides a contents linkage information delivery system to play back a content recorded on a recording medium and to provide, in response to a user request, a related content via a communications channel. Here, the content recorded on a recording medium is not an HTML content that includes links to related contents, but a video or audio content including no links to related contents.

According to the present invention, a content provider is allowed to provide, from a server, a related content that relates to a content recorded on a recording medium, and a user is allowed to play back, with a playback apparatus, the content recorded on the recording medium associatively with the related contents stored on the server. Here, the contents linkage information delivery system of the present invention does not require the content recorded on the recording medium to include a link to the related content on the server. With this feature, there is a significant effect that the present invention is applicable to existing DVDs and CDs storing movie or music contents that include no link information.

As described above, the present invention is highly valuable as it provides a contents linkage information delivery system that achieves effect that is not achieved by no other conventional systems.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback apparatus comprising:
   a reading unit that reads content stored on a recording medium;
   a receiving unit that receives, from a server, electronic bulletin board information corresponding to the content, the electronic bulletin board information containing (i) a comment corresponding to a predetermined position of the content and (ii) an instruction item that corresponds to the comment and indicates that a currently played-back position of the content is to change to the predetermined position of the content corresponding to the comment;

a playback unit that plays back the content read from the recording medium and the electronic bulletin board information corresponding to the content; and a display unit that displays, on a screen, the content and the electronic bulletin board information corresponding to the content, wherein, when an instruction item of electronic bulletin board information displayed on the screen is selected from the screen, the playback unit changes a playback position of the content from the currently played-back position of the content to the predetermined position of the content corresponding to the comment.

2. A server apparatus connected to a playback apparatus that reads content stored on a recording medium, the server apparatus comprising:

a storing unit that stores electronic bulletin board information corresponding to the content, the electronic bulletin board information containing (i) a comment corresponding to a predetermined position of the content and (ii) an instruction item that corresponds to the comment and indicates that a currently played-back position of the content is to change to the predetermined position of the content corresponding to the comment; and a transmitting unit that transmits, to the playback apparatus, the electronic bulletin board information corresponding to the content, wherein the playback apparatus plays back the content read from the recording medium and the electronic bulletin board information corresponding to the content and transmitted from the server apparatus and displays, on a screen, the content and the electronic bulletin board information corresponding to the content, and wherein, when an instruction item of electronic bulletin board information displayed on the screen is selected from the screen, the playback apparatus changes a playback position of the content from the currently played-back position of the content to the predetermined position of the content corresponding to the comment.

3. A playback method comprising:

reading content stored on a recording medium;

receiving, from a server, electronic bulletin board information corresponding to the content, the electronic bulletin board information containing (i) a comment corresponding to a predetermined position of the content and (ii) an instruction item that corresponds to the comment and indicates that a currently played-back position of the content is to change to the predetermined position of the content corresponding to the comment;

playing back the content read from the recording medium and the electronic bulletin board information corresponding to the content; and displaying, on a screen, the content and the electronic bulletin board information corresponding to the content, wherein, when an instruction item of electronic bulletin board information displayed on the screen is selected from the screen, a playback position of the content is changed from the currently played-back position of the content to the predetermined position of the content corresponding to the comment.

4. A method for controlling a server apparatus connectable to a playback apparatus that reads content stored on a recording medium, the method comprising:

storing electronic bulletin board information corresponding to the content, the electronic bulletin board information containing (i) a comment corresponding to a predetermined position of the content and (ii) an instruction item that corresponds to the comment and indicates that a currently played-back position of the content is to change to the predetermined position of the content corresponding to the comment; and transmitting, to the playback apparatus, the electronic bulletin board information corresponding to the content, wherein the playback apparatus plays back the content read from the recording medium and the electronic bulletin board information corresponding to the content and transmitted from the server apparatus and displays, on a screen, the content and the electronic bulletin board information corresponding to the content, and wherein, when an instruction item of electronic bulletin board information displayed on the screen is selected from the screen, the playback apparatus changes a playback position of the content from the currently played-back position of the content to the predetermined position of the content corresponding to the comment.

* * * * *